United States Patent
Tyagi et al.

(10) Patent No.: US 11,971,743 B2
(45) Date of Patent: Apr. 30, 2024

(54) DEFORMABLE ELECTRONIC DEVICE WITH DEFORMATION ESTIMATION SYSTEM AND CORRESPONDING METHODS

(71) Applicant: Motorola Mobility LLC, Chicago, IL (US)

(72) Inventors: Vivek K Tyagi, Chicago, IL (US); Chao Ma, Evanston, IL (US); Joseph V Nasti, Chicago, IL (US); Kevin Dao, Skokie, IL (US); Nikhil Ambha Madhusudhana, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/545,909

(22) Filed: Dec. 8, 2021

(65) Prior Publication Data

US 2023/0176612 A1 Jun. 8, 2023

(51) Int. Cl.
*G06F 1/16* (2006.01)

(52) U.S. Cl.
CPC .......... *G06F 1/1616* (2013.01); *G06F 1/1652* (2013.01); *G06F 1/1681* (2013.01)

(58) Field of Classification Search
None
See application file for complete search history.

(56) References Cited

U.S. PATENT DOCUMENTS

| 2014/0035869 A1 | 2/2014 | Yun et al. |
| 2018/0039339 A1 | 2/2018 | Hennell |
| 2022/0103671 A1 | 3/2022 | Peng |
| 2022/0141983 A1* | 5/2022 | Liu .................. G06F 1/1652 29/525 |
| 2022/0321748 A1* | 10/2022 | Lee .................. H04N 23/57 |

FOREIGN PATENT DOCUMENTS

| EP | 3255867 | 11/2021 |
| WO | 2021052223 | 3/2021 |

OTHER PUBLICATIONS

Townley, Mandy, "GB Search Report", GB2216262.2; dated May 25, 2023.

* cited by examiner

*Primary Examiner* — Anthony Q Edwards
*Assistant Examiner* — Rashen E Morrison
(74) *Attorney, Agent, or Firm* — Philip H. Burrus, IV

(57) ABSTRACT

A deformable electronic device includes a flexible display, one or more sensors, at least one imager, and one or more processors. The one or more sensors detect deformation of the deformable electronic device. The at least one imager, which is disposed beneath the flexible display, captures one or more images of an identifiable marker of the flexible display in response to the one or more sensors detecting the deformation of the deformable electronic device. The one or more processors estimate an amount of the deformation of the deformable electronic device as a function of how far the identifiable marker of the flexible display translates across the at least one imager during the deformation of the deformable electronic device.

20 Claims, 11 Drawing Sheets

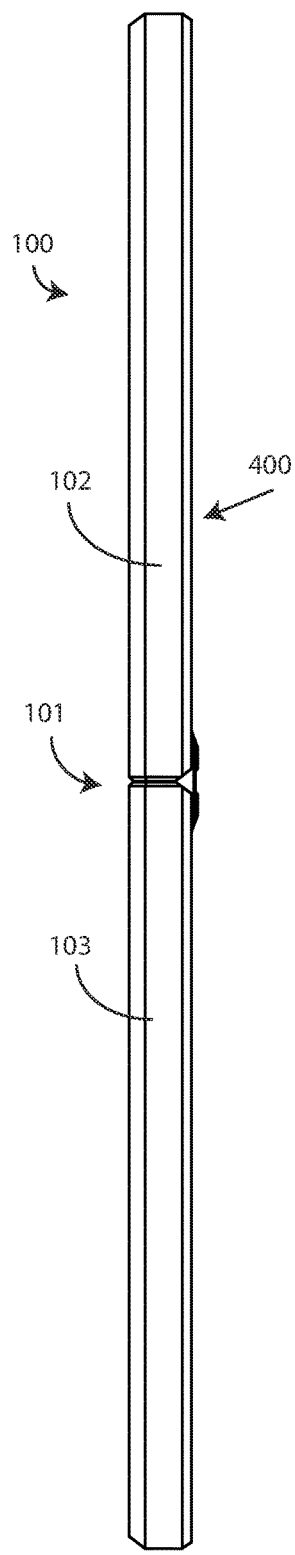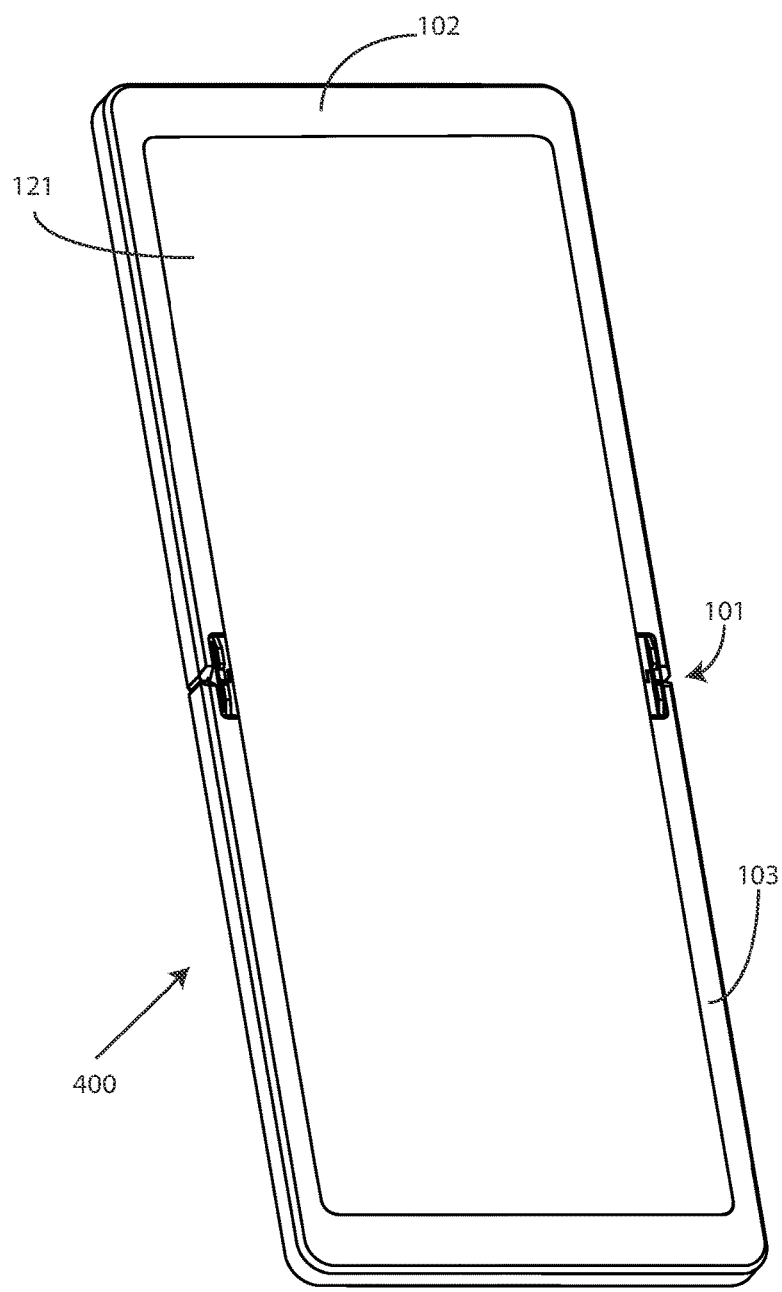
FIG. 4
FIG. 5

DEFORMABLE ELECTRONIC DEVICE WITH DEFORMATION ESTIMATION SYSTEM AND CORRESPONDING METHODS

BACKGROUND

Technical Field

This disclosure relates generally to electronic devices, and more particularly to hinged electronic devices.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer candy bar devices, while others prefer clamshell devices. To satisfy the latter, it would thus be desirable to have an improved hinged electronic device.

BRIEF DESCRIPTION OF THE DRAWINGS

FIG. 4 illustrates a side elevation view of one explanatory electronic device in accordance with one or more embodiments of the disclosure in an axially displaced open position.

FIG. 5 illustrates a perspective view of one explanatory electronic device in accordance with one or more embodiments of the disclosure in the axially displaced open position.

Figure 1:
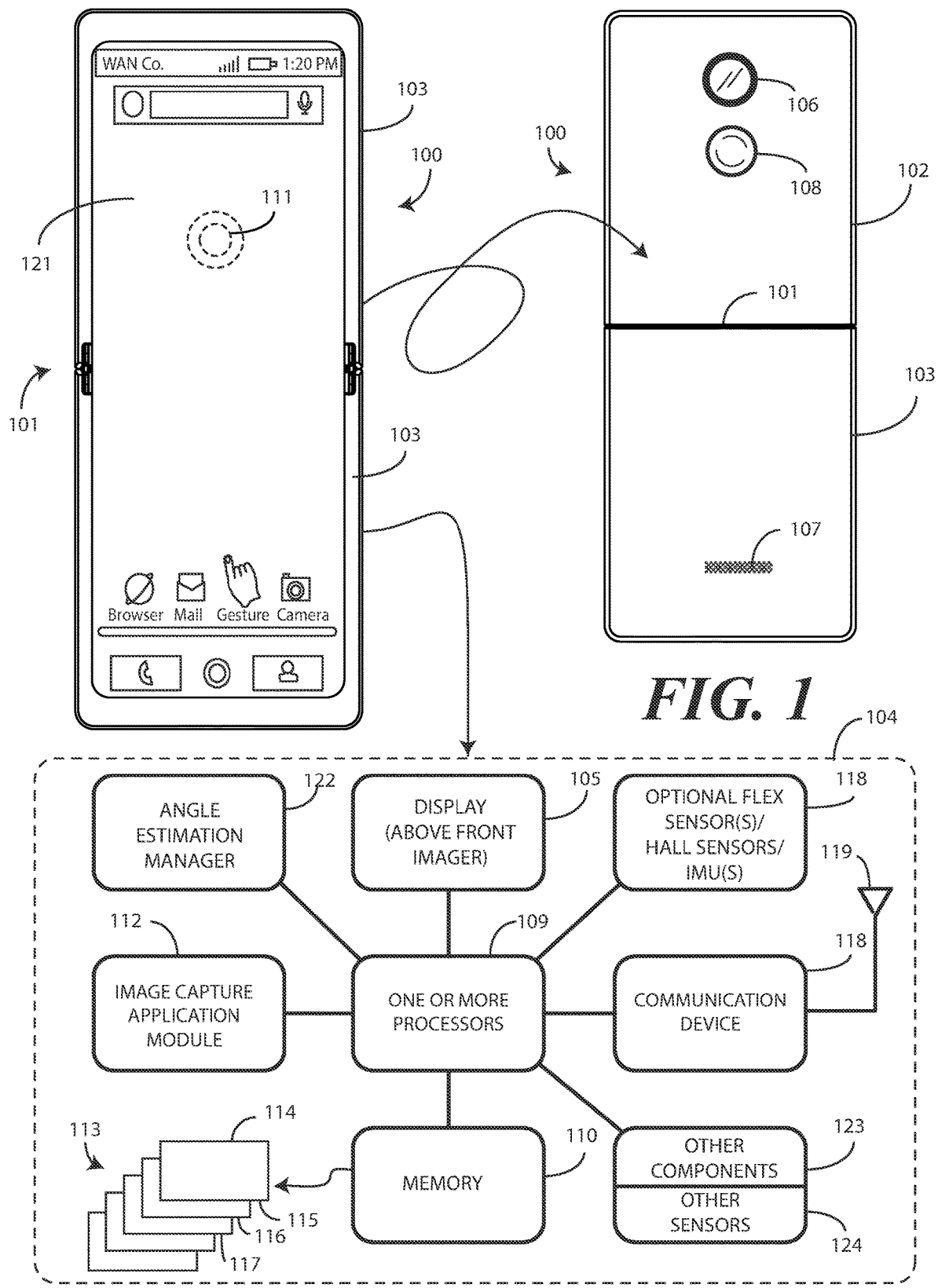
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to estimate an amount of deformation or bending in an electronic device as a function of an amount of translation occurring by a flexible display relative to an imager when the electronic device deforms between an axially displaced open position an and a closed position. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of estimating an amount of deformation in a deformable electronic device as a function of how far an identifiable portion of a flexible display translates across an imager as the electronic device deforms between an axially displaced open position and a closed position as described herein. The non-processor circuits may include, but are not limited to, a radio receiver, a radio transmitter, signal drivers, clock circuits, power source circuits, and user input devices. As such, these functions may be interpreted as steps of a method to perform the estimation of the position of a first device housing relative to a second device housing in three-dimensional space as a function of how far a flexible display moves when the flexible display pivots about a hinge or other deformable portion of the electronic device during deformation.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods and electronic devices that detect, using an imager of the electronic device, a geometry of a deformable electronic device. Embodiments of the disclosure provide an electronic device that is deformable. For example, in some embodiments the electronic device includes a first device housing that is pivotable about a hinge relative to a second device housing between an axially displaced open position and a closed position. In other embodiments, the electronic device includes a deformable housing. In still other embodiments, the electronic device includes multiple hinges or multiple deformable portions.

Using a hinged electronic device as an illustrative example, in one or more embodiments the electronic device includes at least a first device housing and a second device housing. In one or more embodiments, a hinge assembly couples the first device housing to the second device housing so that the first device housing is pivotable about the hinge assembly relative to the second device housing to one or more of a bent configuration, a folded configuration, or other configuration.

In one or more embodiments, a flexible display is coupled to the first device housing and the second device housing. The flexible display then spans the hinge assembly. The flexible display deforms when the first device housing pivots about the hinge assembly relative to the second device housing.

In one or more embodiments, the hinge of the hinge assembly not only facilitates the bending operation, but also works to improve the reliability and usability of the flexible display. In one or more embodiments, the hinge assembly does this via the use of one or more support plates that are coupled to a hinge mechanism situated in a hinge housing. The one or more support plates are then pivotable relative to the hinge housing when the first device housing pivots about the hinge assembly relative to the second device housing.

The hinge assembly and its corresponding support plates serve two functions. First, they provide mechanical support for the flexible display when the first device housing has pivoted about the hinge assembly relative to the second device housing to an axially displaced open position. However, when the first device housing pivots about the hinge assembly relative to the second device housing to a closed position, where interior surfaces of the first device housing and the second device housing abut, the support plates translate along inclined planes of the hinge assembly to recede into recesses defined by the first device housing and second device housing.

Said differently, when the first device housing pivots about the hinge assembly relative to the second device housing to the closed position, the support plates move toward the exterior surfaces of the first device housing and the second device housing, thereby receding "outward" from the interior surfaces of the first device housing and the second device housing. This "collapse" of the first support plate and the second support plate creates a cavity in the hinge region of the electronic device that allows the flexible display to form a service loop when the electronic device is in the closed position. The service loop prevents the flexible display from being damaged or developing memory in the folded position when the electronic device is in the closed position.

In one or more embodiments, the flexible display is positioned within a linear recess of the first device housing and the second device housing so that it—or a fascia disposed atop the flexible display—can be flush with the interior surfaces of the first device housing and second device housing, respectively. In other embodiments, the linear recess will be omitted, and the flexible display will simply sit atop planar interior surfaces of the first device housing and the second device housing.

In either embodiment, when the first device housing pivots about the hinge assembly relative to the second device housing to the axially displaced, open position, the first support plate, the hinge housing, and the second support plate bridge the linear recess (or planar interior surfaces) to provide mechanical support for the flexible display. By contrast, by receding into the housings, the first support plate, the hinge housing, and the second support plate define boundaries within which the flexible display defines a service loop when the first device housing and the second device housing pivot about the hinge assembly from the axially displaced open position to a closed position. Embodiments of the disclosure thus provide a hinge mechanism that properly supports a flexible display when a hinged electronic device is in the open position.

Embodiments of the disclosure contemplate that when the flexible display is fixedly coupled to the first device housing and also fixedly coupled to the second device housing, with the first device housing, hinge, and second device housing configured to cause the flexible display to extend and become substantially planar when the first device housing and second device housing are in the axially displaced open position, the path length of the mechanical mechanism defined by the first support plate, the second support plate, and the hinge housing can be different than the path length of the flexible display when each is in the closed position. Said differently, for an electronic device configured to extend a flexible display flat when in the axially displaced open position, when the electronic device is in the closed position, the length of the service loop defined by the flexible display and the mechanical boundaries defined by the first support plate, hinge housing, and second support plate may be different.

In particular, and to provide sufficient room for the service loop, the mechanical mechanism defined by the first support plate, the hinge housing, and the second support plate may be longer than the length of display that bends to define the service loop. This difference in length can be problematic in that it can result in either deformations in the service loop when the electronic device is in the closed position, or alternatively mechanical strain or unevenness in the flexible display when the electronic device is in the axially displaced open position.

This issue can be addressed in multiple ways. In some embodiments, one or more spring-loaded trays can be included within one or both of the first device housing or the second device housing. A first end of the flexible display can be attached directly to one of the device housings, while the second end of the flexible display is attached to a spring-loaded tray coupled to the other device housing. A spring then biases the tray away from the hinge to flatten the flexible display when the first device housing is pivoted to an axially displaced open position. An example of such a solution is described in commonly assigned U.S. Pat. No. 10,491,725 to Harmon et al., entitled "Hinged Electronic Device with Moving Support Plates for a Flexible Display and Corresponding Systems," which is incorporated herein by reference for all purposes.

While a spring-loaded plate can be used to apply tension to one end of the flexible display to compensate for the distance differential, in other embodiments the hinge assembly changes a displacement between a hinge housing and the first device housing and second device housing, respectively, as the first device housing and second device housing pivot about the hinge assembly between the axially displaced open position and the closed position. Effectively, such hinges cause the hinge housing of the hinge assembly to get closer to the first device housing and second device housing, respectively, when the electronic device is in the axially displaced open position, and farther from the hinge housing when the electronic device is in the closed position. This changing distance compensates for the difference between the bending length of the flexible display and the length of the mechanical mechanism supporting the flexible display. An example of such a solution is described in commonly assigned U.S. patent application Ser. No. 17/018,932 to Lim et al., entitled "Hinged Electronic Device with Displacement Altering Hinge and Corresponding Systems," which was filed on Sep. 11, 2020, and which is incorporated herein by reference for all purposes. These hinges eliminate the need for any spring-loaded plate.

Regardless of which implementation is used, from the perspective of each device housing the flexible display translates along their support surfaces when those device housings pivot about the hinge. Embodiments of the disclosure take advantage of this small amount of movement to estimate the overall geometry of the electronic device.

Illustrating by example, in one or more embodiments the electronic device includes one or more sensors that detect deformation of the electronic device in the form of a first device housing pivoting about a hinge relative to a second device housing. In one or more embodiments, one or both of the first device housing and the second device housing include an imager disposed beneath the flexible display. In one or more embodiments, the imager is capable of at least partially capturing images through the flexible display.

Since the flexible display moves relative to the imager when the first device housing pivots about the hinge relative to the second device housing, in one or more embodiments the imager captures one or more images of an identifiable marker of the flexible display. The identifiable marker can be configured as a hardware marker, a marker defined by content presented on the flexible display, or otherwise. The imager captures the one or more images in response to the one or more sensors detecting the deformation of the electronic device in one or more embodiments. One or more processors then estimate an amount of deformation, e.g., how far the first device housing pivots relative to the second device housing about the hinge, as a function of how far the identifiable marker of the flexible display translates across the imager during the deformation or bending.

In effect, in a foldable electronic device an imager, one example of which is a red-green-blue (RGB) camera, disposed beneath the flexible display can be used to detect the geometric angle or configuration of the electronic device by capturing images that provide an indication of how far a portion of the flexible display has moved relative to the flexible display. The flexible display can contain identifiable markers that are positioned within the field of view of the imager such that the absolute position of these markers can be reliably and accurately determined so that the one or more processors of the electronic device can calculate a fold angle of the electronic device.

Advantageously, embodiments of the disclosure provide a solution to the problem of determining the open angle of a foldable device electronic so that the user interface, display, or other components of the electronic device can be configured according to the form-factor and angle. Embodiments of the disclosure take advantage of the fact that an image capture device in a foldable electronic device is positioned beneath the display. In one or more embodiments, the image capture device looks "through" the display layers to capture images, which is in contrast to situating the image capture device aside of or adjacent to the display in a notch or hole. The small amount of movement of the flexible display that occurs as the electronic device deforms across various fold angles is targeted for detection to determine the angle. Accordingly, embodiments of the disclosure provide a novel and desirable solution for determining device geometry in deformable electronic devices comprising image capture devices situated beneath a flexible display that translates relative to the imager as the electronic device deforms.

Knowledge of the device geometry can be used in a variety of ways. As noted above, the device geometry can be used to configure the presentation of information on a primary display to provide a more viewable, usable, and more efficient user interface for a user.

The device geometry can be used in other ways as well. For example, in one or more embodiments a deformable electronic device comprises a first image capture device and a second image capture device that are both situated under a foldable display. In one or more embodiments, when the electronic device deforms, the foldable display deforms outward, thereby extending about the exterior of a convex angle defined by the bending of the electronic device.

In one or more embodiments, one or more processors provide a high-level logical image processing system for each image capture device. In one or more embodiments, the one or more processors are capable of processing images captured by the two (or more) image capture devices as a function of the identified or estimated geometry, e.g., degrees of bend defined by angle between first device housing portion and second device housing portion, to stitch, merge, concatenate, superimpose, and perform other processing steps upon the content streams being captured by each image capture device.

By understanding the geometry of the electronic device occurring when images are captured, embodiments of the disclosure allow users to seamlessly and instantly create a variety of composite image types. Examples include combined "selfie" images with expanded fields of view, extreme wide-angle images, fusion images, multi-user videoconferencing images, front/rear fusion images concatenating images from opposite sides of the electronic device, panoramic images, fusion front and back camera view depicting a user and scene, fusion videoconferencing views where participants see each other and what the other person sees, fusion front and back views showing two users on each side of the electronic device, extending views from each imager to create a semi-panoramic composite image, and dual camera video logging views that allow for creative movie making. Examples of such image compositions are described in commonly assigned U.S. patent application Ser. No. 17/161,573, filed Jan. 28, 2021, entitled, "Image Processing as a Function of Deformable Electronic Device Geometry and Corresponding Devices and Methods," which is incorporated herein by reference for all purposes.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge assembly 101 couples the first device housing 102 to the second device housing 103. In one or more embodiments, the first device housing 102 is selectively pivotable about the hinge assembly 101 relative to the second device housing 103. For example, in one or more embodiments the first device housing 102 is selectively pivotable about the hinge assembly 101 between a closed position, shown and described below with reference to FIG. 2, and an axially displaced open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge assembly. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface of the electronic device 100. Users can deliver user input to the display 105 of such an embodiment by delivering touch input from a finger, stylus, or other objects disposed proximately with the display 105.

In one embodiment, the display 105 is configured as an organic light emitting diode (OLED) display fabricated on a flexible plastic substrate, thereby making the display 105 a flexible display 121. This allows the display 105 to be flexible so as to deform when the first device housing 102 pivots about the hinge assembly 101 relative to the second device housing 103. In one or more embodiments, the OLED display is constructed on flexible plastic substrates can allow the flexible display 121 to bend with various bending radii.

In one or more embodiments the flexible display 121 may be formed from multiple layers of flexible material such as flexible sheets of polymer or other materials. In this illustrative embodiment, the flexible display 121 is fixedly coupled to the first device housing 102 and the second device housing 103. The flexible display 121 spans the hinge assembly 101 in this illustrative embodiment.

Features can be incorporated into the first device housing 102 and/or the second device housing 103. Examples of such features include a camera 106 or an optional speaker port 107, which are shown disposed on the rear side of the electronic device 100 in this embodiment but could be placed on the front side as well.

In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments. In other embodiments, these features may be omitted.

Other features can be added and can be located on the front of one or both of the first device housing 102 and/or the second device housing 103, sides of one or both of the first device housing 102 and/or the second device housing 103, or in other locations as well. Illustrating by example, in one or more embodiments an imager 111 is positioned on the front side of the electronic device 100. In the illustrative embodiment of FIG. 1, the imager 111 is positioned beneath the flexible display 121. Additionally, in this illustrative embodiment the imager 111 is positioned to one side of the deformable region defined by the hinge assembly 101. In other embodiments, one example of which will be described below with reference to FIGS. 17-18, a second imager can be disposed on another side of the deformable region of the electronic device 100 as well.

The imager 111, which can be any number of types of image capture devices, has its lens situated such that it is directed through the flexible display 121 when the first device housing 102 has been pivoted about the hinge assembly 101 relative to the second device housing 103 to the axially displaced open position shown in FIG. 1. This allows the imager 111 to receive light directed through the flexible display 121 as will be described in more detail below.

A block diagram schematic 104 of the electronic device 100 is also shown in FIG. 1. The block diagram schematic 104 can be configured as a printed circuit board assembly disposed within either or both of the first device housing 102 or the second device housing 103 of the electronic device 100. Various components can be electrically coupled together by conductors or a bus disposed along one or more printed circuit boards. For example, some components of the block diagram schematic 104 can be configured as a first electronic circuit fixedly situated within the first device housing 102, while other components of the block diagram schematic 104 can be configured as a second electronic circuit fixedly situated within the second device housing 103. A flexible substrate can then span the hinge assembly 101 to electrically couple the first electronic circuit to the second electronic circuit.

It should be noted that the block diagram schematic 104 includes many components that are optional, but which are included in an effort to demonstrate how varied electronic devices configured in accordance with embodiments of the disclosure can be. Thus, it is to be understood that the block diagram schematic 104 of FIG. 1 is provided for illustrative purposes only and for illustrating components of one electronic device 100 in accordance with embodiments of the disclosure. The block diagram schematic 104 of FIG. 1 is not intended to be a complete schematic diagram of the various components required for an electronic device 100. Therefore, other electronic devices in accordance with embodiments of the disclosure may include various other components not shown in FIG. 1 or may include a combination of two or more components or a division of a particular component into two or more separate components, and still be within the scope of the present disclosure.

In one or more embodiments, the electronic device 100 includes one or more processors 109. The one or more processors 109 can be a microprocessor, a group of processing components, one or more Application Specific Integrated Circuits (ASICs), programmable logic, or other type of processing device. The one or more processors 109 can be operable with the various components of the electronic device 100. The one or more processors 109 can be configured to process and execute executable software code to perform the various functions of the electronic device 100. A storage device, such as memory 110, can optionally store the executable software code used by the one or more processors 109 during operation.

In one or more embodiments, the electronic device 100 also includes one or more image capture application modules 112. In one or more embodiments, each imager, e.g., imager 111 and camera 106, include a separate image capture application module. In other embodiments, the electronic device 100 will include a single image capture application module that is operable with multiple imagers.

In one or more embodiments, the image capture application module 112 identifies actuation of one or more imagers. For example, where the electronic device 100 includes one image capture application module 112 operable with the imager 111 and the camera 106, the image capture application module 112 can identify actuation of imager 111 and/or the camera 106, along with other image capture operations.

The image capture application module 112 can also include a facial recognition module that analyzes images captured by the imager 111 and/or camera 106 to identify facial characteristics present in images captured by the imager 111 and/or camera 106. In one or more embodiments, the image capture application module 112 can also detect an identifiable marker of the flexible display 121, which allows the one or more processors 109 to estimate an amount of deformation of the electronic device 100 about the hinge assembly 101 as a function of how far the identifiable marker translates across the imager 111 when the first device housing 102 pivots about the hinge assembly 101 relative to the second device housing 103. This estimation process will be described in more detail below.

In one or more embodiments, the image capture application module 112 includes an electronic image stabilization engine. The electronic image stabilization engine receives orientation determination signals from one or more inertial motion units and uses the received orientation data communicated by the orientation determination signals to compensate for vibrations, motion, and shaking experienced by the imager 111 and/or camera 106. Such vibrations, motion, or shaking can occur when a person is capturing images with the imager 111 or camera 106 while holding the electronic device 100 in their hand.

In one or more embodiments, the electronic image stabilization engine processes the orientation data communicated by the orientation determination signals to correct the angular movement experienced by the imager 111 or camera 106. In one or more embodiments, the electronic image stabilization engine continuously detects the movement and vibrations of the electronic device 100 from the orientation determination signals received from the inertial motion unit(s) and automatically adjusts the frame of the image being captured so that successive frames—or even sensors capturing a single frame—see the same image details.

In one or more embodiments, each imager operable with the imager capture application module 112, e.g., imager 111 and/or camera 106, can be simply a conventional imager. For example, these imagers can comprise a two-dimensional imager configured to receive at least one image of objects within an environment of the electronic device 100. In one embodiment, these imagers comprise a two-dimensional Red-Green-Blue (RGB) imager. In another embodiment, these imagers comprise a two-dimensional infrared imager. Other types of imagers suitable for use as imager 111, camera 106, or other imagers of the electronic device 100 will be obvious to those of ordinary skill in the art having the benefit of this disclosure.

In other embodiments, these imagers can be more complex. Illustrating by example, in another embodiment one or more of imager 111, camera 106, or the other imagers of the electronic device 100 also include a depth imager. Where included, the depth imager can take a variety of forms. In a first embodiment, the depth imager comprises a pair of imagers separated by a predetermined distance, such as three to four images. This "stereo" imager works in the same way the human eyes do in that it captures images from two different angles and reconciles the two to determine distance.

In another embodiment, the depth imager employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager comprises a time-of-flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, where included the depth imager adds a third "z-dimension" to the x-dimension and y-dimension defining the two-dimensional image captured by the two-dimensional imager, thereby enhancing the image capture features of the electronic device 100.

In one or more embodiments, the one or more processors 109 are further responsible for performing the primary functions of the electronic device 100. For example, in one embodiment the one or more processors 109 comprise one or more circuits operable to present presentation information, such as images, text, and video, on the flexible display 121. The executable software code used by the one or more processors 109 can be configured as one or more modules 113 that are operable with the one or more processors 109. Such modules 113 can store instructions, control algorithms, and so forth.

In one embodiment, the one or more processors 109 are responsible for running the operating system environment 114. The operating system environment 114 can include a kernel, one or more drivers 115, and an application service layer 116, and an application layer 117. The operating system environment 114 can be configured as executable code operating on one or more processors or control circuits of the electronic device 100.

In one or more embodiments, the one or more processors 109 are responsible for managing the applications of the electronic device 100. In one or more embodiments, the one or more processors 109 are also responsible for launching, monitoring and killing the various applications and the various application service modules. The applications of the application layer 117 can be configured as clients of the application service layer 116 to communicate with services through application program interfaces (APIs), messages, events, or other inter-process communication interfaces.

In this illustrative embodiment, the electronic device 100 also includes a communication circuit 118 that can be configured for wired or wireless communication with one or more other devices or networks. The networks can include a wide area network, a local area network, and/or personal area network. The communication circuit 118 may also utilize wireless technology for communication, such as, but are not limited to, peer-to-peer or ad hoc communications, and other forms of wireless communication such as infrared technology. The communication circuit 118 can include wireless communication circuitry, one of a receiver, a transmitter, or transceiver, and one or more antennas 119.

Figure 2:
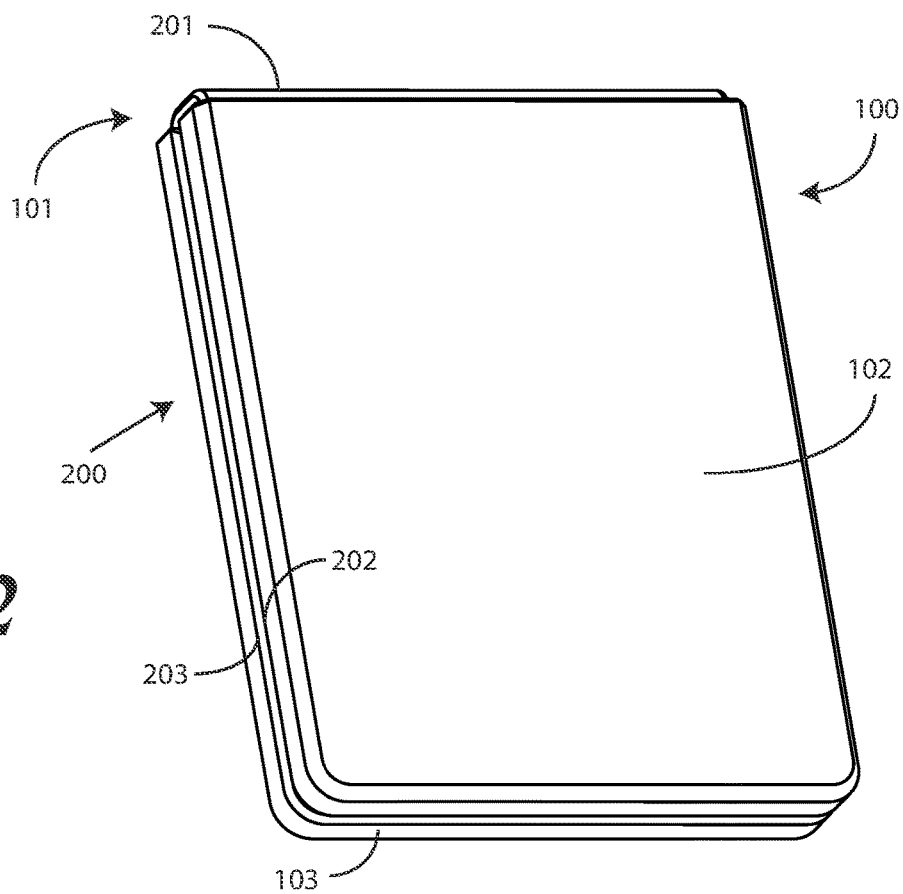
FIG. 2 illustrates a perspective view of one explanatory electronic device in accordance with one or more embodiments of the disclosure in a closed position.
Figure 3:
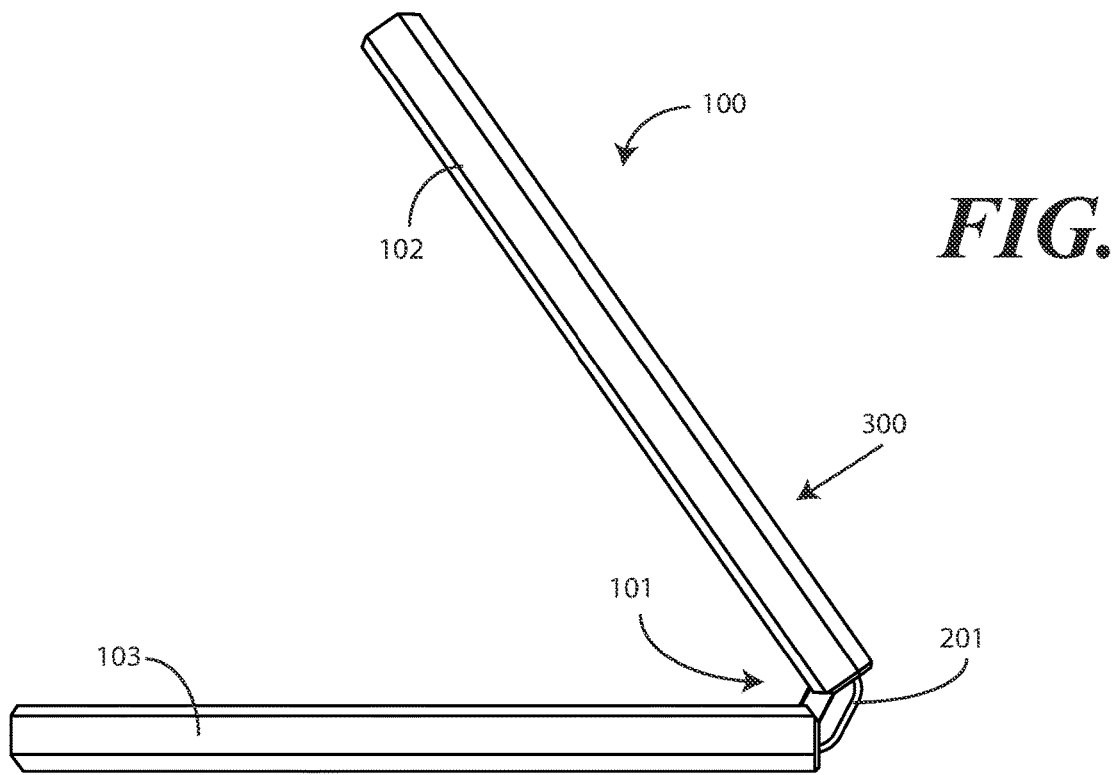
FIG. 3 illustrates a side elevation view of one explanatory electronic device in accordance with one or more embodiments of the disclosure in a partially open position.

In one embodiment, the electronic device 100 optionally includes one or more flex sensors 124, operable with the one or more processors 109, to detect a bending operation that causes the first device housing 102 to pivot about the hinge assembly 101 relative to the second device housing 103, thereby transforming the electronic device 100 into a deformed geometry such as that shown in FIGS. 2-3. The one or more flex sensors 124 can detect initiation of the first device housing 102 pivoting, bending, or deforming about the hinge assembly 101 relative to the second device housing 103. The one or more flex sensors 124 can take various forms.

In one or more embodiments, one or more flex sensors 124 comprise passive resistive devices manufactured from a material with an impedance that changes when the material is bent, deformed, or flexed. By detecting changes in the impedance as a function of resistance, the one or more processors 109 can use the one or more flex sensors to detect bending or flexing. In one or more embodiments, each flex sensor comprises a bi-directional flex sensor that can detect flexing or bending in two directions. In one embodiment, the one or more flex sensors 124 have an impedance that increases in an amount that is proportional with the amount it is deformed or bent.

In one embodiment, each flex sensor is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor bends, the impedance of the resistive layer changes, thereby altering the flow of current for a given voltage. The one or more processors 109 can detect this change to determine that bending is occurring. Taps can be added along each flex sensor to determine other information, including the number of folds, the degree of each fold, the location of the folds, the direction of the folds, and so forth. The flex sensor can further be driven by time-varying signals to increase the amount of information obtained from the flex sensor as well.

While a multi-layered device as a flex sensor is one configuration suitable for detecting a bending operation occurring to deform the electronic device 100, the one or more flex sensors 124 can include other devices as well. For instance, a magnet can be placed in the first device housing 102 while a magnetic sensor is placed in the second device housing 103, or vice versa. The magnetic sensor could be Hall-effect sensor, a giant magnetoresistance effect sensor, a tunnel magnetoresistance effect sensor, an anisotropic magnetoresistive sensor, or other type of sensor.

In still other embodiments, the one or more flex sensors 124 can comprise an inductive coil placed in the first device housing 102 and a piece of metal placed in the second device housing 103, or vice versa. When the metal gets closer to, or farther from, the coil, the one or more flex sensors 124 detect that a bending operation is occurring.

In other embodiments the one or more flex sensors 124 can comprise an inertial motion unit situated in the first device housing 102 and another inertial motion unit situated in the second device housing 103. The one or more processors 109 can compare motion sensor readings from each inertial motion unit to detect movement of the first device housing 102 relative to the second device housing 103, as well as the orientation of the first device housing 102 and the second device housing 103 relative to the direction of gravity. This data can be used to detect bending of the first device housing 102 and the second device housing 103.

Where included in the one or more flex sensors 124, each inertial motion unit can comprise a combination of one or more accelerometers, one or more gyroscopes, and optionally one or more magnetometers, to determine the orientation, angular velocity, and/or specific force of one or both of the first device housing 102 or the second device housing 103. When included in the electronic device 100, these inertial motion units can be used as orientation sensors to measure movement of one or both of the first device housing 102 or the second device housing 103 in three-dimensional space. Similarly, the inertial motion units can be used as orientation sensors to measure the motion of one or both of the first device housing 102 or second device housing 103 in three-dimensional space. The inertial motion units can be used to make other measurements as well.

Where only one inertial motion unit is included in the first device housing 102, this inertial motion unit is configured to determine an orientation, which can include measurements of azimuth, plumb, tilt, velocity, angular velocity, acceleration, and angular acceleration, of the first device housing 102. Similarly, where two inertial motion units are included, with one inertial motion unit being situated in the first device housing 102 and another inertial motion unit being situated in the second device housing 103, each inertial motion unit determines motion of its respective device housing is occurring. Inertial motion unit can determine measurements of azimuth, plumb, tilt, velocity, angular velocity, acceleration, angular acceleration, and so forth of the first device housing 102, while inertial motion unit can determine measurements of azimuth, plumb, tilt, velocity, angular velocity, acceleration, angular acceleration, and so forth of the second device housing 103, and so forth.

In one or more embodiments, each inertial motion unit delivers these orientation measurements to the one or more processors 109 in the form of orientation determination signals. Thus, the inertial motion unit situated in the first device housing 102 outputs a first orientation determination signal comprising the determined orientation of the first device housing 102, while the inertial motion unit situated in the second device housing 103 outputs another orientation determination signal comprising the determined orientation of the second device housing 103.

In one or more embodiments, the orientation determination signals are delivered to the one or more processors 109, which report the determined orientations to the various modules, components, and applications operating on the electronic device 100. In one or more embodiments, the one or more processors 109 can be configured to deliver a composite orientation that is an average or other combination of the orientation of orientation determination signals. In other embodiments, the one or more processors 109 are configured to deliver one or the other orientation determination signal to the various modules, components, and applications operating on the electronic device 100.

In another embodiment the one or more flex sensors 124 comprise proximity sensors that detect movement of a first end of the electronic device 100 relative to a second end of the electronic device 100. Still other examples of the one or more flex sensors 124 will be obvious to those of ordinary skill in the art having the benefit of this disclosure.

In one or more embodiments, the imager 111 can be used to determine an angle between the first device housing 102 and the second device housing 103. As will be described below in more detail with reference to FIGS. 12-13, in one or more embodiments the flexible display 121 moves across the imager 111 when the first device housing 102 pivots about the hinge assembly 101 relative to the second device housing 103. This movement can be due to the inclusion of a spring-loaded plate to which the flexible display 121 is coupled, or due to the fact that the hinge assembly 101 changes the displacement between the first device housing 102 and the second device housing 103 when they pivot about the hinge assembly 101.

In one or more embodiments when the one or more flex sensors 124 detect deformation of the electronic device 100, the imager 111 can capture one or more images of an identifiable marker of the flexible display 121. In one or more embodiments, the capture of these images occurs in response the one or more flex sensors 124 detecting the deformation.

The one or more processors 109, optionally operating with an angle estimation manager 122, can then process these images, optionally with the image capture application module 112, to determine how far the identifiable marker has moved across the imager 111. As translation of the flexible display 121, and therefore translation of the identifiable marker of the flexible display 121, is proportional to how far the first device housing 102 has pivoted about the hinge assembly 101 relative to the second device housing 103, the one or more processors 109 can use this translation information to estimate and amount of the deformation as a function of how far the identifiable marker of the flexible display 121 has translated across the imager 111 during the deformation process.

In one or more embodiments, the imager 111 is configured as an intelligent imager. Where configured as an intelligent imager, the imager 111 can capture one or more images of environments about the electronic device 100 through the flexible display 121 to determine whether the object matches predetermined criteria. For example, the intelligent imager can operate as an identification module configured with optical recognition such as image recognition, character recognition, visual recognition, facial recognition, color recognition, shape recognition and the like. Advantageously, the intelligent imager can recognize whether an identifiable marker, which could be configured as a hardware component of the flexible display 121 that is visible to the imager 111, content presentation presented on the flexible display 121, or otherwise, has moved.

In one or more embodiments, the angle estimation manager 122 is configured to generate estimates, with one or more processors 109, of an amount of deformation of the electronic device 100 by comparing least one image captured by the imager 111 to at least one other image to determine how far the identifiable marker of the flexible display 121 has moved during the deformation of the electronic device 100. The angle estimation manager 122 can be configured as a hardware module operable with the one or more processors 109 in one or more embodiments. In other embodiments, the angle estimation manager 122 is configured as software or firmware operating on the one or more processors 109. In still other embodiments, the angle estimation manager 122 is configured as a hardware component integrated within the one or more processors 109. Other configurations for the angle estimation manager 122 will be obvious to those of ordinary skill in the art having the benefit of this disclosure.

In one or more embodiments, the angle estimation manager 122 determines an amount of translation of the flexible display 121 from one or more images captured by the imager 111 when the first device housing 102 and the second device housing 103 pivot about the hinge assembly 101 between the axially displaced open position and the closed position. From this information, the one or more processors 109 can estimate a position of the first device housing 102 relative to the second device housing 103 in three-dimensional space as a function of the amount of translation.

Other components 123 of the electronic device 100 may include a microphone, an earpiece speaker, a loudspeaker, key selection sensors, a touch pad sensor, a touch screen sensor, a capacitive touch sensor, and one or more switches. Touch sensors may be used to indicate whether any of the user actuation targets present on the flexible display 121 are being actuated. Alternatively, touch sensors disposed along the first device housing 102 and/or the second device housing 103 can be used to determine whether the electronic device 100 is being touched at side edges or major faces of the electronic device 100. The touch sensors can include surface and/or housing capacitive sensors in one embodiment.

The other components 123 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion. In one embodiment the motion detectors are also operable to detect movement, and direction of movement, of the electronic device 100 by a user.

In one or more embodiments, the other components 123 include a gravity detector. For example, as one or more accelerometers and/or gyroscopes may be used to show vertical orientation, constant, or a measurement of tilt relative to gravity. The other components 123 operable with the one or more processors 109 can include output components such as video outputs, audio outputs, and/or mechanical outputs. Examples of output components include audio outputs, an earpiece speaker, haptic devices, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Turning now to FIG. 2, illustrated therein is the electronic device 100 in a closed state. In this state, the first device housing 102 has been pivoted about the hinge assembly 101 toward the second device housing 103 to a closed position 200. When in the closed position 200, a front surface 202 of the first device housing 102 abuts a front surface 203 of the second device housing 103. Additionally, in this illustrative embodiment, a hinge housing 201 comprising the hinge of the hinge assembly 101 is revealed when the electronic device 100 is in the closed position 200.

In other embodiments, the hinge housing 201 will remain concealed when the first device housing 102 pivots about the hinge assembly 101 relative to the second device housing 103 to the closed position 200. Effectively, in either embodiment, the first device housing 102 and the second device housing 103 are analogous to clam shells that have been shut by the claim, thereby giving rise to the "clamshell" style of device. When the clamshell opens, the flexible display (121) is revealed.

In some embodiments, features can be included to further retain the electronic device 100 in the closed position 200. Illustrating by example, in another embodiment, a mechanical latch can be included to retain the first device housing 102 and the second device housing 103 in the closed position 200.

In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 200.

In still other embodiments, frictional elements can be incorporated into the hinge assembly 101 to retain the first device housing 102 and the second device housing 103 in a particular position. A stator motor could be integrated into the hinge assembly 101 as well. Still other mechanical structures and devices suitable for retaining the electronic device 100 in the closed position 200 will be obvious to those of ordinary skill in the art having the benefit of this disclosure. As will be described below, in other embodiments retention devices can be omitted due to the fact that torsion springs used in combination with a cam having mechanical detents and a stator with mechanical protrusions are used.

Turning now to FIG. 3, the electronic device 100 is shown being transitioned from the closed position (200) of FIG. 2 to a partially open position 300. Specifically, the first device housing 102 is pivoting about the hinge assembly 101 away from the second device housing 103 toward an open position. The open position 300 shown in FIG. 3 is a "tent position." In the side elevation view of FIG. 3, the hinge housing 201 is exposed between the first device housing 102 and the second device housing 103.

Turning now to FIGS. 4 and 5, illustrated therein is the electronic device 100 in an axially displaced open position 400. In the axially displaced open position 400, the first device housing 102 is rotated about the hinge assembly 101 so as to be axially displaced 180-degrees out of phase with the second device housing 103, thereby revealing the flexible display 121 of this embodiment. In this illustrative embodiment, this causes the hinge housing (201) to be concealed within the first device housing 102 and second device housing 103.

In such a configuration, the first device housing 102 and the second device housing 103 effectively define a plane.

Since this illustrative embodiment includes a flexible display 121, the flexible display 121 has been elongated into a flat position.

Figure 6:
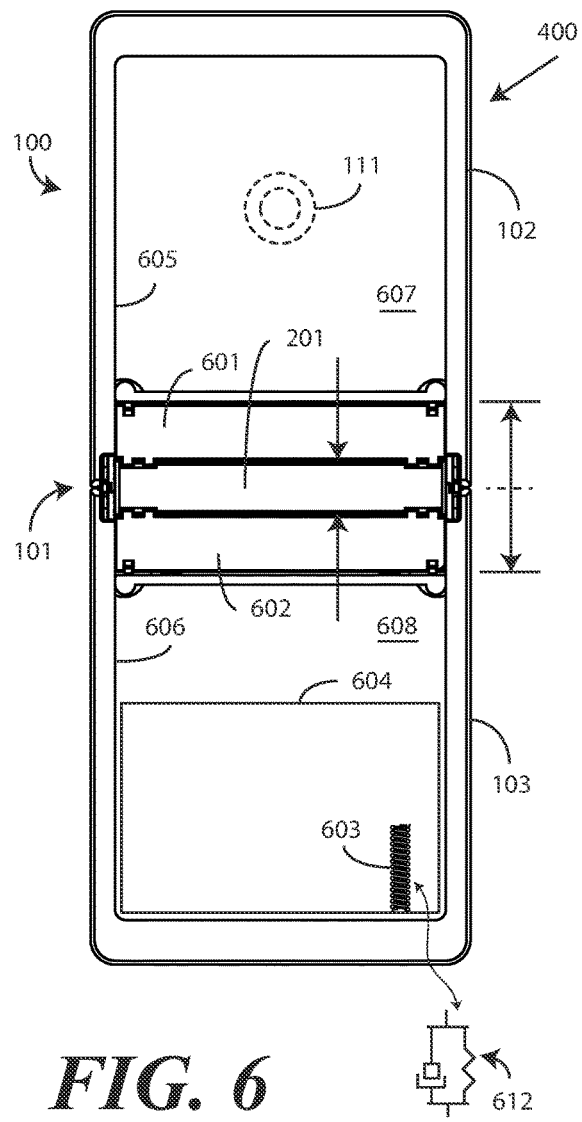
FIG. 6 illustrates an elevation view of one explanatory electronic device in accordance with embodiments of the disclosure with the flexible display removed so that the hinge is visible.

Turning now to FIG. 6, the electronic device 100 is shown with the flexible display (121), as well as any overlaying fascia, removed so that additional details of the hinge assembly 101 can more readily be seen. As shown in FIG. 6, in one or more embodiments the hinge assembly 101 comprises the hinge housing 201, a first support plate 601 pivotally coupled to a first side of the hinge housing 201 and extending distally into the first device housing 102 from the first side of the hinge housing 201, and a second support plate 602 pivotally coupled to a second side of the hinge housing 201 and extending distally into the second device housing 103 from the second side of the hinge housing 201.

In one or more embodiments, the first device housing 102 and the second device housing 103 each define linear recesses 605,606 into which the flexible display (121) may be positioned. In one or more embodiments, the flexible display (121) is positioned within the linear recess 605 of the first device housing 102 and the linear recess 606 of the second device housing 103 so that it—or a fascia disposed atop the flexible display (121)—sits flush with the interior surface 607 of the first device housing 102 and the interior surface 608 of the second device housing 103. In other embodiments, the linear recess 605,606 will be omitted, and the flexible display (121) and any accompanying fascia will simply sit atop planar surfaces defined by the interior surface 607 of the first device housing 102 and the interior surface 608 of the second device housing 103.

Where the linear recesses 605,606 are included, the flexible display (121) can be positioned within these linear recesses 605,606 to span the hinge assembly 101. Regardless of whether the linear recesses 605,606 are included, when the first device housing 102 pivots about the hinge assembly 101 relative to the second device housing 103 to the axially displaced, open position 400 shown in FIG. 6, the first support plate 601, the hinge housing 201, and the second support plate 602 bridge the linear recesses 605,606 (or planar interior surfaces in the other embodiment) to provide positive mechanical support for the flexible display (121).

Where electrical components, e.g., processors, memories, communication circuits, and other component described in the block diagram schematic (104) of FIG. 1 are positioned in each of the first device housing 102 and the second device housing 103, a flexible conductor (not shown) can be included between the hinge assembly 101 and the flexible display (121). The flexible conductor, which can bend as the first device housing 102 and the second device housing 103 pivot about the hinge assembly 101 to the closed position (200), allows electrical signals to pass back and forth between circuit components disposed in the first device housing 102 and the second device housing 103. In some embodiments, the flexible conductor can provide additional mechanical support for the flexible display (121) when the first device housing 102 and the second device housing 103 pivot about the hinge assembly 101 to the closed position (200) as well.

In one or more embodiments, one or more spring-loaded trays can be included within one or both of the first device housing 102 or the second device housing 103. In the illustrative embodiment of FIG. 6, a tray 604, which is spring loaded and slidable, and which is disposed within the second device housing 103, is visible. Placing the tray 604 in the second device housing 103 allows the imager 111 to remain exposed beneath the flexible display (121). It should be noted that while the tray 604 is shown only in the second device housing 103 in this illustrative embodiment, it could be disposed in the first device housing 102 as well. Illustrating by example, the tray 604 could include an aperture through which the imager 111 can see. Additionally, in other embodiments both the first device housing 102 and the second device housing 103 could include trays as well.

In one or more embodiments, a first end of the flexible display (121) can be coupled to the first device housing 102. The second end of the flexible display (121) can then be coupled to the tray 604. In one or more embodiments, the tray 604 is slidably coupled to the second device housing 103 and is biased away from the hinge assembly 101 by a spring 603. It should be noted that while a spring 603 is used to bias the tray 604 away from the hinge assembly 101 in this illustrative embodiment, in other embodiments the spring 603 can be replaced by a damper device 612. In one or more embodiments, the damper device 612 comprises a spring with a nested shock damper, which can be pneumatic or hydraulic, to dampen the action of the spring. Other devices suitable for use instead of the spring 603 will be obvious to those of ordinary skill in the art having the benefit of this disclosure.

Once again it should be noted in the discussion of the tray 604 and spring 603 that while only one tray 604 is shown in FIG. 6, the first device housing 102 could likewise include a tray that is slidably coupled to the first device housing 102 and biased away from the hinge assembly 101 by at least another spring, damper device, or other springy object. In such an embodiment, rather than being coupled to the first device housing 102, the first end of the flexible display (121) could be coupled to the second tray.

In either embodiment, the spring(s) 603 biases the tray 604 away from the hinge assembly 101 to flatten the flexible display (121) when the first device housing 102 pivots about the hinge assembly 101 away from the second device housing 103 to the axially displaced open position 400. Where a flexible connector is included, it can have its first end coupled to the second device housing 103, while a second end is coupled to a tray 604. In one or more embodiments, the spring 603 biases the tray 604 away from the hinge assembly 101, and thus away from the second device housing 103, to straighten the flexible display (121) when the first device housing 102 is pivoted about the hinge assembly 101 away from the second device housing 103 to the axially displaced open position 400.

Figure 7:
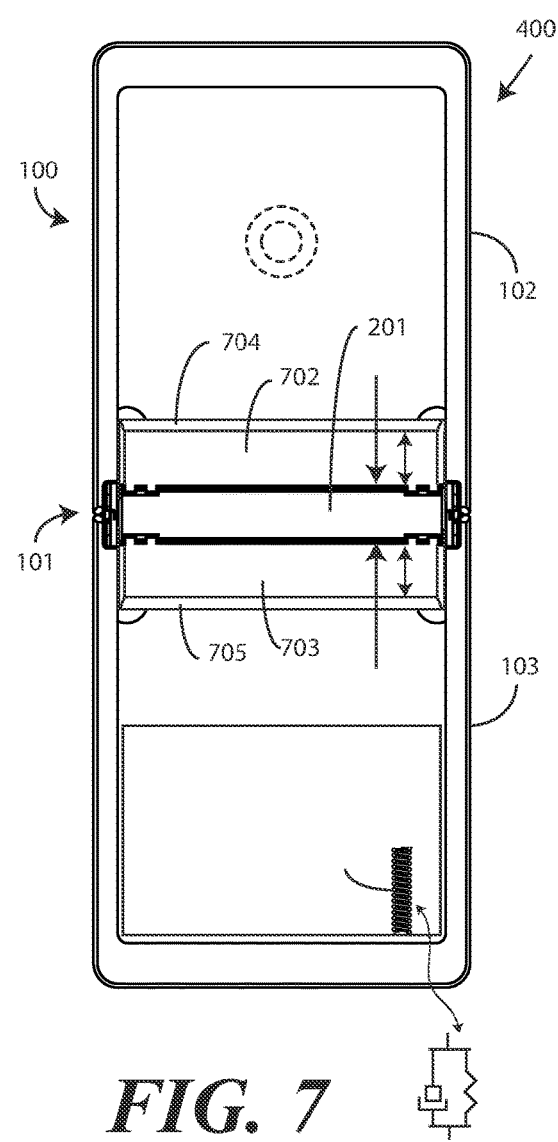
FIG. 7 illustrates an elevation view of one explanatory electronic device in accordance with embodiments of the disclosure with portions of the hinge removed so that other portions of the device housing are visible.

Turning now to FIG. 7, illustrated therein is another view of the electronic device 100 is shown with the first support plate (601) and the second support plate (602) removed so that additional details of the first device housing 102 and the second device housing 103 can more readily be seen. As shown in FIG. 7, in one or more embodiments each of the first device housing 102 and the second device housing 103 define a support plate receiving recess 702,703. In this illustrative embodiment, the support plate receiving recess 702 of the first device housing 102 is disposed to a first side of the hinge housing 201, while the support plate receiving recess 703 of the second device housing 103 is disposed to the second side of the hinge housing 201.

In one or more embodiments, the support plate receiving recesses 702,703 provide recessed, open space within the first device housing 102 and the second device housing 103 that allows the flexible display (121) room to form a service loop when the first device housing 102 and the second device housing 103 pivot about the hinge assembly 101 to the closed position (200). Such a service loop will be shown below with reference to FIG. 8. This service loop occurs due to the fact that the flexible display (121) deforms when the first device housing 102 pivots about the hinge assembly 101 relative to the second device housing 103 from the axially displaced open position 400 to the closed position (200).

In one or more embodiments, each support plate receiving recess 702,703 comprises an inclined plane 704,705. In this illustrative embodiment, the first support plate receiving recess 702 defines an inclined plane 704 that is disposed distally a predefined distance across a bottom surface of the first support plate receiving recess 702 from the hinge housing 201. Similarly, the second support plate receiving recess 703 defines an inclined plane 705 that is disposed distally a predefined distance across a bottom surface of the second support plate receiving recess 703 from the hinge housing 201.

Figure 8:
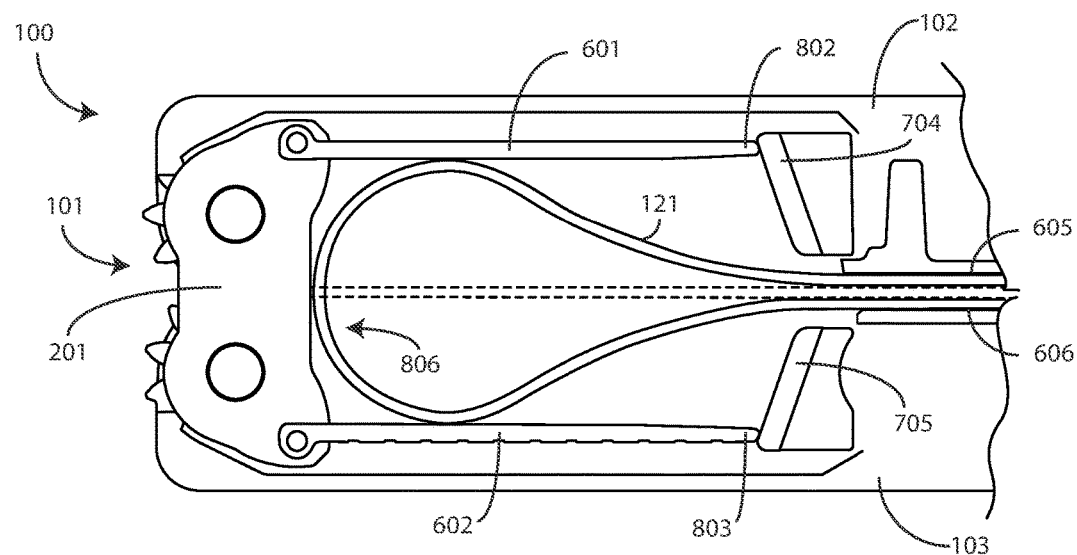
FIG. 8 illustrates a cut away view of a hinge portion of an electronic device in accordance with one or more embodiments of the disclosure when the electronic device is in the closed position.

Turning now to FIG. 8, illustrated therein is a cut away view of the electronic device 100. In this illustration, the flexible display 121 is positioned within the linear recesses 605,606 of the first device housing 102 and the second device housing 103, respectively, with a first end of the flexible display 121 is coupled to the tray (604) in the first device housing 102 and a second end of the flexible display 121 coupled to the second device housing 103.

As shown in FIG. 8, the first device housing 102 and the second device housing 103 have been pivoted about the hinge assembly 101 to the closed position (200). In one or more embodiments, when this occurs, a distal end 802,803 of each of the first support plate 601 and the second support plate 602 travels along its respective inclined plane 704,705 between a first position (shown in FIG. 9) within the first device housing 102 and the second device housing 103, respectively, to a second position (shown in FIG. 8) within the first device housing 102 and the second device housing 103, respectively.

Figure 9:
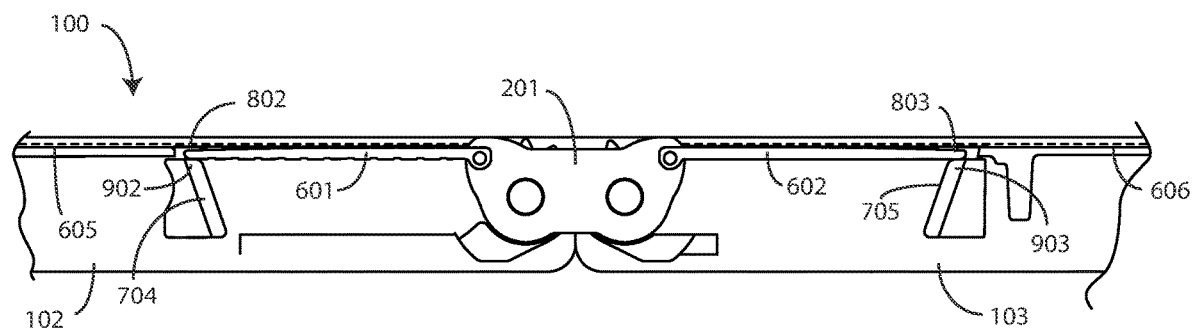
FIG. 9 illustrates a cut away view of a hinge portion of an electronic device in accordance with one or more embodiments of the disclosure when the electronic device is in the open position.

The distal ends 802,803 of each of the first support plate 601 and the second support plate 602 therefore travel, in one or more embodiments, along their respective inclined planes 704,705 between the first position of FIG. 9 within the first device housing 102 and the second device housing 103, respectively, to the second position of FIG. 8 within the first device housing 102 and the second device housing 103, respectively, when the first device housing 102 and the second device housing 103 pivot about the hinge assembly 101 from an axially displaced open position (400) to the closed position (200) of FIG. 8. When this occurs, the first support plate 601, the hinge housing 201, and the second support plate 602 define boundaries within which the flexible display 121 defines a service loop 806. The area opened for the service loop 806 by the translation of the first support plate 601 and the second support plate 602, in one embodiment, has a radius of at least five millimeters. Such a radius prevents the flexible display 121 from kinking or folding. It also works to minimize mechanical memory problems when the first device housing 102 and the second device housing 103 pivot about the hinge assembly 101 to the open position (400).

Turning now to FIG. 9, the first device housing 102 and the second device housing 103 have been rotated about the hinge assembly 101 to the axially displaced open position (400). When this occurs, due to the action of the hinge housing 201, the distal ends 802,803 of the first support plate 601 and the second support plate 602 translate up their respective inclined planes 704,705 from the second position of FIG. 8 to the first position shown in FIG. 9. In the illustrative embodiment of FIG. 9, when the distal ends 802,803 of the first support plate 601 and the second support plate 602 fully translate up their respective inclined planes 704,705 from the second position of FIG. 8 to the first position shown in FIG. 9, they sit atop ends 902,903 of the inclined planes 704,705. In this position, and as shown in FIG. 9, the first support plate 601, the hinge housing 201, and the second support plate 602 bridge the linear recess 605 of the first device housing 102 and the linear recess 606 of the second device housing 103.

In the illustrative embodiment of FIGS. 8-9, one or more spring-loaded trays can be included within one or both of the first device housing 102 or the second device housing 103. While inclusion of a spring-loaded tray works well in practice, in other embodiments the hinge assembly 101 is configured to alter a displacement between the hinge housing 201 and the first device housing 102 and second device housing 103, respectively, when the first device housing 102 and the second device housing 103 pivot about the hinge housing 201 between the axially displaced open position (400) and the closed position (200).

This changing of the displacement eliminates the need for any spring-loaded tray, as it allows the flexible display 121 to be fixedly coupled to the first device housing 102 and the second device housing 103, respectively. Moreover, the flexible display 121 can fully extend when the electronic device 100 is in the axially displaced open position (400), while still forming a proper service loop when the electronic device 100 is in the closed position (200).

Figures 10, 11:
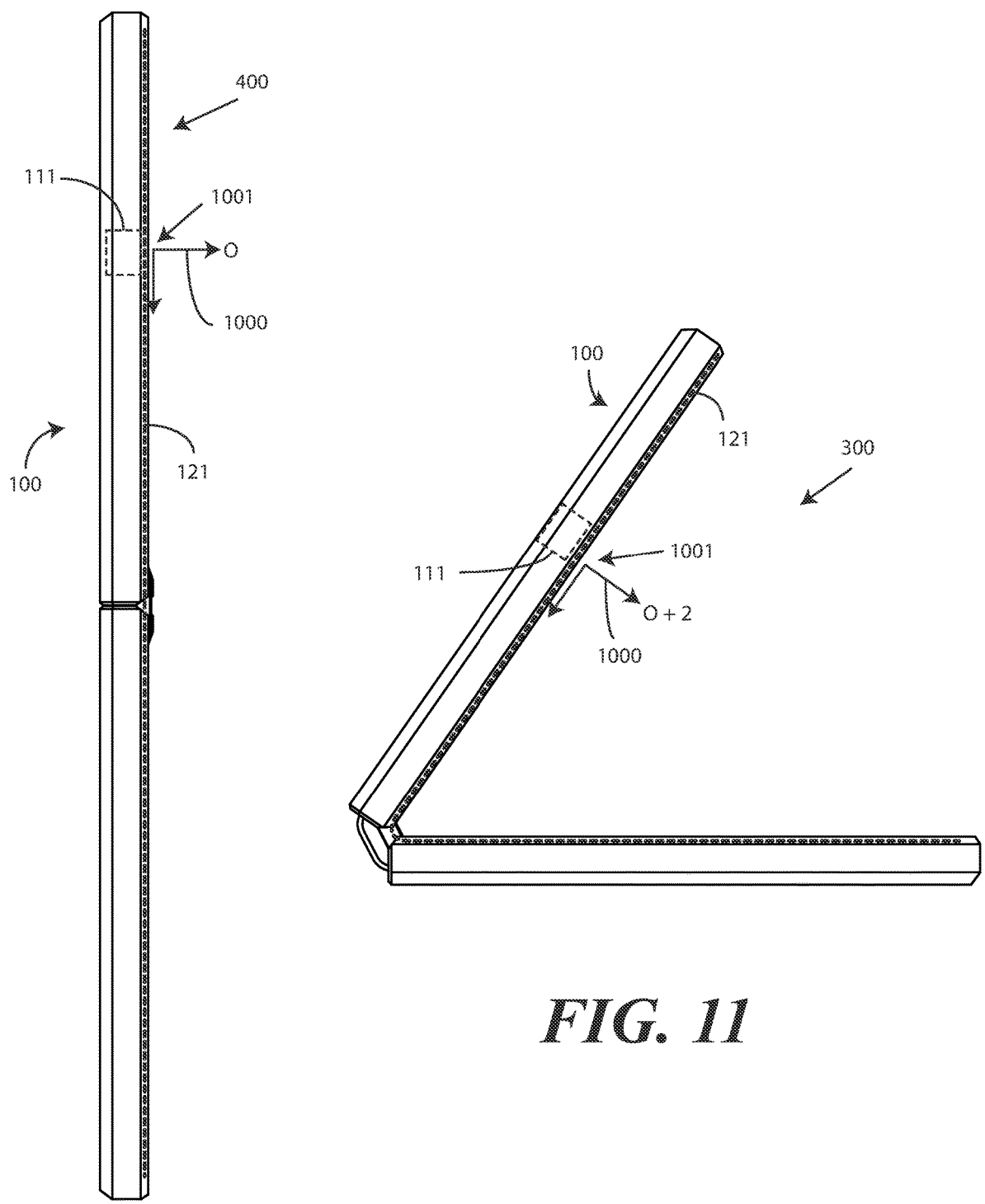
FIG. 10 illustrates one explanatory electronic device in accordance with one or more embodiments of the disclosure in an axially displaced open position, with a flexible display situated in a first position relative to an imager.
FIG. 11 illustrates the explanatory electronic device of FIG. 10 in a partially open position, with the flexible display situated in a second position relative to the imager.

Regardless of whether a spring-loaded tray or a displacement changing hinge is employed, their operation causes the flexible display 121 to translate across the imager (111) as previously described. However, this translation can be advantageously measured when the imager 111 captures one or more images. The one or more processors (109) of the electronic device 100 can then use this information to determine an angle between the first device housing 102 and the second device housing 103. Turning now to FIGS. 10-11, this translation of the flexible display 121 across the imager 111 is shown pictorially.

Beginning with FIG. 10, the electronic device 100 is shown in the axially displaced open position 400. Reference axis 1000 is assigned to a portion of the flexible display 121 situated at the location 1001 and positioned directly above the center of the imager 111. This location establishes a "reference location" where this portion, which could be one or more pixels, one or more circuit components, a group of light-emitting elements, or other element of the flexible display 121 situates directly above the center of the imager 111. While the reference location is being established when the electronic device 100 is in the axially displaced open position 400 of FIG. 10, it could equally be established when the electronic device 100 is in the closed position (200) in other embodiments.

Turning now to FIG. 11, as shown therein the electronic device 100 has transitioned from the axially displaced open position (400) of FIG. 10 to a partially open position 300. As shown, the first device housing 102 has pivoted about the hinge assembly 101 toward the second device housing 103, and toward the closed position (200). When this occurs, the flexible display 121 translates across the imager 111. As noted above, this can be due to the inclusion of a spring-loaded plate, the use of a displacement changing hinge mechanism, or can occur for other reasons. This translation results in the location 1001 of the flexible display 121 having moved from a location centrally situated atop the imager 111 to another location closer to the edge of the imager 111. That the portion 1001 has moved is confirmed by the fact that the reference axis 1000 has moved to a new location closer to the hinge assembly 101.

In one or more embodiments, the flexible display 121 includes an identifiable marker positioned at the location 1001. In one or more embodiments, the identifiable marker comprises a hardware component of the flexible display 121. Illustrating by example, the identifiable marker may comprise a group of three light-emitting components that are recognizable to the imager 111. In other embodiments, the identifiable marker can comprise content being presented on the flexible display 121 at the location 1001 that is recognizable by the imager 111.

In one or more embodiments, the one or more flex sensors (124) of the electronic device 100 detect the commencement of the first device housing 102 pivoting about the hinge assembly 101 relative to the second device housing 103 from the axially displaced open position (400) of FIG. 10 to the partially open position 300 of FIG. 11.

In one or more embodiments, when this occurs, the imager 111 captures one or more images of the identifiable marker situated at the location 1001. As translation of the flexible display 121, and therefore translation of the identifiable marker of the flexible display 121, is proportional to how far the first device housing 102 has pivoted about the hinge assembly 101 relative to the second device housing 103, the one or more processors (109) of the electronic device 100 can use this translation information to estimate and amount of the deformation as a function of how far the identifiable marker of the flexible display 121 has translated across the imager 111 during the deformation process. Thus, the one or more processors (109) can estimate an amount of deformation, which is between thirty and forty-five degrees in FIG. 11.

Figure 12:
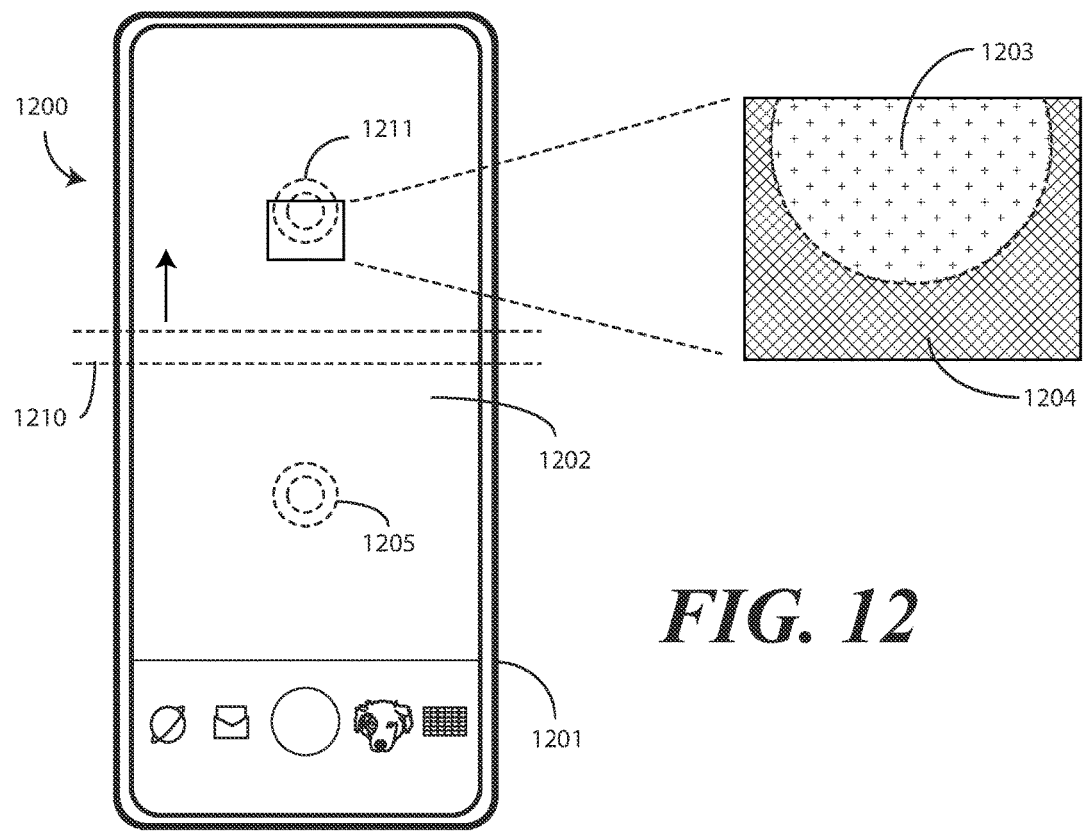
FIG. 12 illustrates another explanatory electronic device in accordance with one or more embodiments of the disclosure in an axially displaced open position, with a flexible display situated in a first position relative to an imager.
Figure 13:
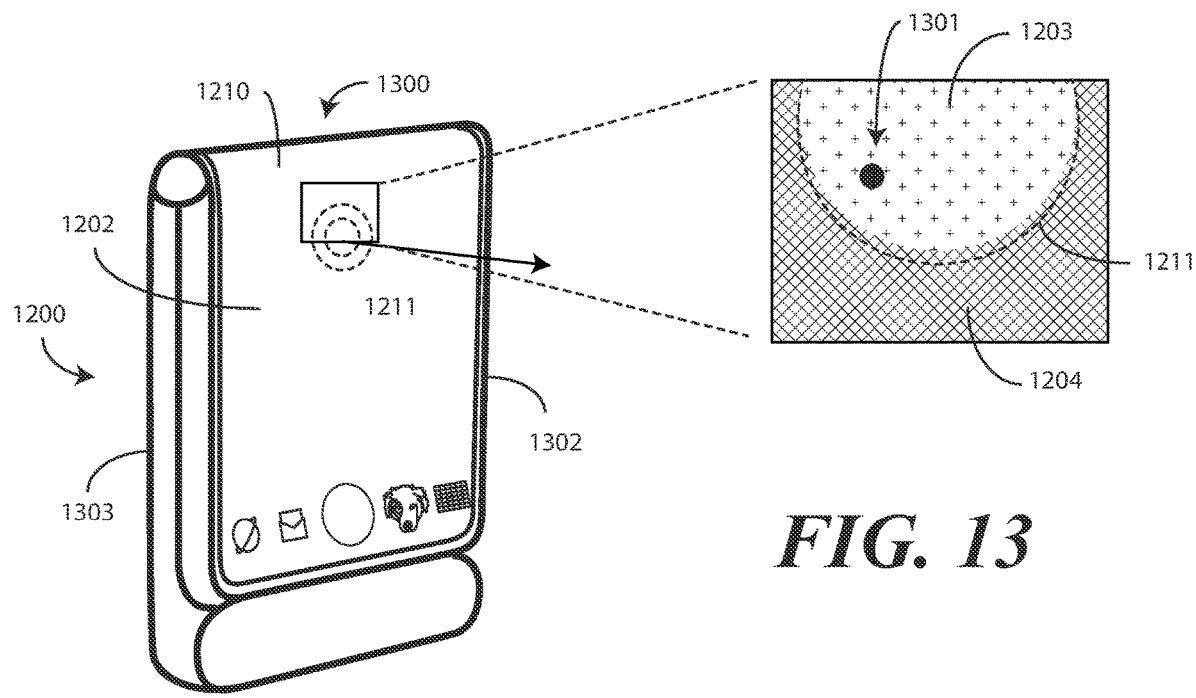
FIG. 13 illustrates the explanatory electronic device of FIG. 12 in a folded position, with the flexible display situated in a second position relative to the imager.

This concept is shown in further detail in FIGS. 12-13. Turning first to FIG. 12, illustrated therein is another explanatory electronic device 1200 configured in accordance with one or more embodiments of the disclosure. The electronic device 1200 of FIG. 12 is again a portable electronic device and includes a flexible display 1202.

The explanatory electronic device 1200 of FIG. 12 also includes a housing 1201 supporting the flexible display 1202. In one or more embodiments, the housing 1201 is flexible. In one embodiment, the housing 1201 may be manufactured from a malleable, bendable, or physically deformable material such as a flexible thermoplastic, flexible composite material, flexible fiber material, flexible metal, organic or inorganic textile or polymer material, or other materials. Where the housing 1201 is a deformable housing, it can be manufactured from a single flexible housing member or from multiple flexible housing members.

In other embodiments, the housing 1201 could also be a combination of rigid segments connected by hinges (like the electronic device 100 of FIG. 1) or flexible materials. For instance, the electronic device 1200 could alternatively include a first device housing and a second device housing with a hinge coupling the first device housing to the second device housing such that the first device housing is selectively pivotable about the hinge relative to the second device housing. The first device housing can be selectively pivotable about the hinge between a closed position, a partially open position, and an axially displaced open position.

In other embodiments, the housing 1201 could be a composite of multiple components.

For instance, in another embodiment the housing 1201 could be a combination of rigid segments connected by hinges or flexible materials. Still other constructs will be obvious to those of ordinary skill in the art having the benefit of this disclosure In one or more embodiments when the electronic device 1200 is deformed by a bend at a deformable portion 1210 of the electronic device 1200, this results in at least one imager 1211 capturing one or more images of an identifiable marker of the flexible display 1202. In one or more embodiments, the at least one imager 1211 captures at least one image of the identifiable marker while being positioned beneath the flexible display 1202. The initiation of the capture of the one or more images can be triggered by one or more flex sensors, as previously described.

In this illustrative embodiment, the electronic device 1200 includes two imagers 1211,1205. Each imager 1211,1205 is positioned beneath the flexible display 1202.

In one or more embodiments, the flexible display 1202 includes a first pixel portion 1203 situated above imager 1211 when the electronic device 1200 is in the axially displaced open position and a second pixel portion 1204 situated at areas of the flexible display 1202 other than those positioned above the imager 1211. The portion of the flexible display 1202 situated above imager 1205 could similarly be configured.

In one embodiment, the first pixel portion 1203 comprises only transparent organic light emitting diode pixels. In another embodiment, the pixels disposed in the first pixel portion 1203 comprise a combination of transparent organic light emitting diode pixels and reflective organic light emitting diode pixels. Other configurations will be obvious to those of ordinary skill in the art having the benefit of this disclosure.

In one or more embodiments, the entire extent of the flexible display 1202 is available for presenting images. While some borders are shown in FIG. 12, in one or more embodiments there is no need for the device housing 1201 of the electronic device 1200 to include borders that picture frame the flexible display 1202. To the contrary, in one or more embodiments the flexible display 1202 can span an entire major face of the electronic device 1200 so that the entirety of the major face can be used as active display area.

One way this "borderless" display is achieved is by placing the imagers 1211,1205, and optionally any other sensors beneath the first pixel portion 1203 such that the imagers 1211,1205 and/or other sensors are collocated with the first pixel portion 1203 or portions. This allows the imagers 1211,1205 and/or other sensors to receive signals through the transparent portions of the first pixel portion 1203. Advantageously, the imagers 1211,1205 can take pictures through the first pixel portion 1203, and thus need not to be adjacent, i.e., to the side of, the flexible display 1202. This allows the flexible display 1202 to extend to the border of the top of the electronic device 1200 rather than requiring extra space for only the imagers 1211,1205.

In one or more embodiments, the second pixel portion 1204 comprises only reflective light emitting diode pixels. Content can be presented on a first pixel portion 1203 comprising only transparent organic light emitting diode pixels or sub-pixels or a combination of transparent organic light emitting diode pixels or sub-pixels and reflective organic light emitting diode pixels or sub-pixels. The content can also be presented on the second pixel portion 1204 comprising only the reflective organic light emitting diode pixels or sub-pixels.

When a user desires to capture an image with either or both of imagers 1211,1205, one or more processors of the electronic device 1200 cause the transparent organic light emitting diode pixels or sub-pixels to cease emitting light in one or more embodiments. This cessation of light emission prevents light emitted from the transparent organic light emitting diode pixels or sub-pixels from interfering with light incident upon the first pixel portion 1203. When the transparent organic light emitting diode pixels or sub-pixels are turned OFF, they become optically transparent in one or more embodiments.

In some embodiments, the second pixel portion 1204 will then remain ON when the first pixel portion 1203 ceases to emit light. However, in other embodiments the second pixel portion 1203 will be turned OFF as well. The requisite imagers 1211,1205 can then be actuated to capture an image from the light passing through the transparent organic light emitting diode pixels or sub-pixels. Thereafter, the one or more processors can resume the presentation of data along the first pixel portion 1203 of the flexible display 1202. In one or more embodiments, this comprises actuating the transparent organic light emitting diode pixels or sub-pixels, thereby causing them to again begin emitting light.

As noted above, the electronic device 1200 of FIG. 12 is a deformable electronic device, having both a device housing 1201 and a flexible display 1202 that can be deformed by one or more bends, deformations, or folds. The electronic device 1200 is shown in an undeformed configuration in FIG. 12, and in a fully deformed configuration in FIG. 13. More specifically, the geometry of the electronic device 1200 defines a plane in FIG. 12, while a first device housing portion 1302 is abutting a second device housing portion 1303 in FIG. 13.

As shown in FIG. 13, in one or more embodiments the geometry of the electronic device 1200 defines a bend 1300 with at least one imager 1211 situated on the first device housing portion 1302 and positioned on a first side of the bend 1300 and the at least one other imager (1205) situated on the second device housing portion 1303 positioned to a second side of the bend 1300. As with the electronic device (100) of FIGS. 1-11, when this occurs the flexible display 1202 translates relative to at least one imager 1211.

Illustrating by example, as shown in FIG. 13 the electronic device 1200 has transitioned from the undeformed configuration of FIG. 12 to a fully deformed configuration. The first device housing portion 1302 has pivoted about the deformation portion 1210 toward the second device housing portion 1303 to the point where they abut.

When this occurs, the flexible display 1202 translates across the imager 1211. This translation results in the first pixel portion 1203 of the flexible display 1202 having moved from a location centrally situated atop the imager 1211 to another location that is slightly offset toward an edge of the imager 1211. That the first pixel portion 1203 has moved is confirmed by the fact that it is no longer perfectly aligned with the imager 1211 in FIG. 13.

In one or more embodiments, the flexible display 1202 includes an identifiable marker 1301. In one or more embodiments, the identifiable marker 1301 comprises a hardware component of the flexible display 1202. Illustrating by example, the identifiable marker may comprise a group of three light-emitting components that are recognizable to the imager 1211. In other embodiments, the identifiable marker can comprise content being presented on the flexible display 1202 that is recognizable by the imager 1211.

In one or more embodiments, the one or more flex sensors of the electronic device 1200 detect the commencement of the first device housing portion 1302 pivoting about the deformable portion 1210 relative to the second device housing portion 1303. In one or more embodiments, when this occurs, the imager 1211 captures one or more images of the identifiable marker 1301.

As translation of the flexible display 1202, and therefore translation of the identifiable marker 1301 of the flexible display 1202, is proportional to how far the first device housing portion 1302 has pivoted about the deformation portion 1210 relative to the second device housing portion 1303, the one or more processors of the electronic device 1200 can use this translation information to estimate and amount of the deformation as a function of how far the identifiable marker 1301 of the flexible display 1202 has translated across the imager 1211 during the deformation process. Thus, the one or more processors can estimate an amount of deformation, which is between a full 180-degrees in FIG. 13.

In one or more embodiments, an angle estimation manager of the electronic device 1200 is configured to generate estimates, with one or more processors, of an amount of deformation of the electronic device 1200 by comparing least one image captured by the imager 1211 to at least one other image to determine how far the identifiable marker 1301 of the flexible display 1202 has moved during the deformation of the electronic device 1200. In one or more embodiments, the angle estimation manager determines an amount of translation of the flexible display 1202 from one or more images captured by the imager 111 when the first device housing portion 1302 and the second device housing portion 1303 pivot about the deformation portion 1210. From this information, the one or more processors can estimate a position of the first device housing portion 1302 relative to the second device housing portion 1303 in three-dimensional space as a function of the amount of translation.

Figure 14:
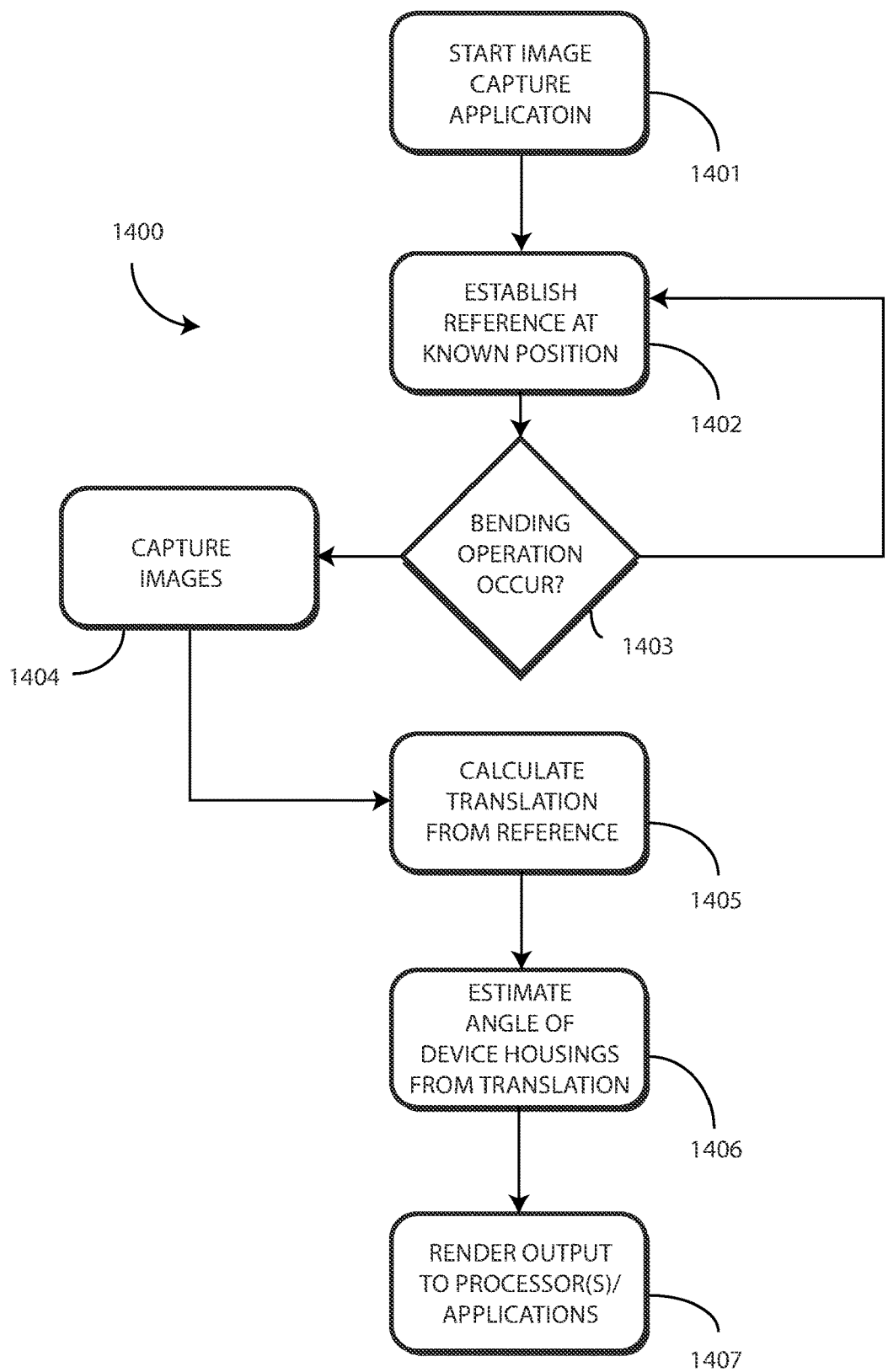
FIG. 14 illustrates one explanatory method in accordance with one or more embodiments of the disclosure.

Turning now to FIG. 14, illustrated therein is one explanatory method 1400 illustrating how this geometry estimation process can occur. Beginning at step 1401, an image capture application operable at least one imager situated beneath a flexible display of a deformable electronic device is actuated. At step 1402, the at least one imager captures at least one image of an identifiable marker of the flexible display when the identifiable marker is in a reference position. Illustrating by example, of the electronic device is deformable between an axially displaced open position and a closed position, the at least one imager may capture at least one image of the identifiable marker when the electronic device is in the axially displaced open position. Alternatively, the at least one imager may capture at least one image of the identifiable marker in the closed position. Accordingly, in one or more embodiments step 1402 comprises the at least one imager capturing images of the identifiable marker when the deformable electronic device is configured in a predefined geometry.

The identifiable marker can take a variety of forms. In one or more embodiments, the identifiable marker comprises a hardware component of the flexible display. For instance, turning briefly to FIG. 15, in one or more embodiments the identifiable marker 1501 comprises a predefined group of light emitting elements that are positioned along the first pixel portion 1203. In one or more embodiments, such an identifiable marker 1501 may be configured to project light toward the imager 1211 when the imager 1211 captures images of the same in this reference position. In one or more embodiments, since light is being projected toward the imager 1211, and so as not to distract a user of the electronic device 1200, the imager 1211 captures one or more images of the identifiable marker 1501 while operating in a low-light mode of operation.

Turning now back to FIG. 14, at decision 1403 one or more sensors of the electronic device detect whether deformation of the deformable electronic device is occurring. If it is not, the electronic device remains in the reference position at step 1402. However, where the one or more sensors detect deformation occurring at decision 1403, the method moves to step 1404.

At step 1404, the at least one imager of the electronic device disposed beneath the flexible display captures one or more images of the identifiable marker (1501). This step 1404 can occur in variety of ways, two of which are shown in FIGS. 17-18.

Figure 15:
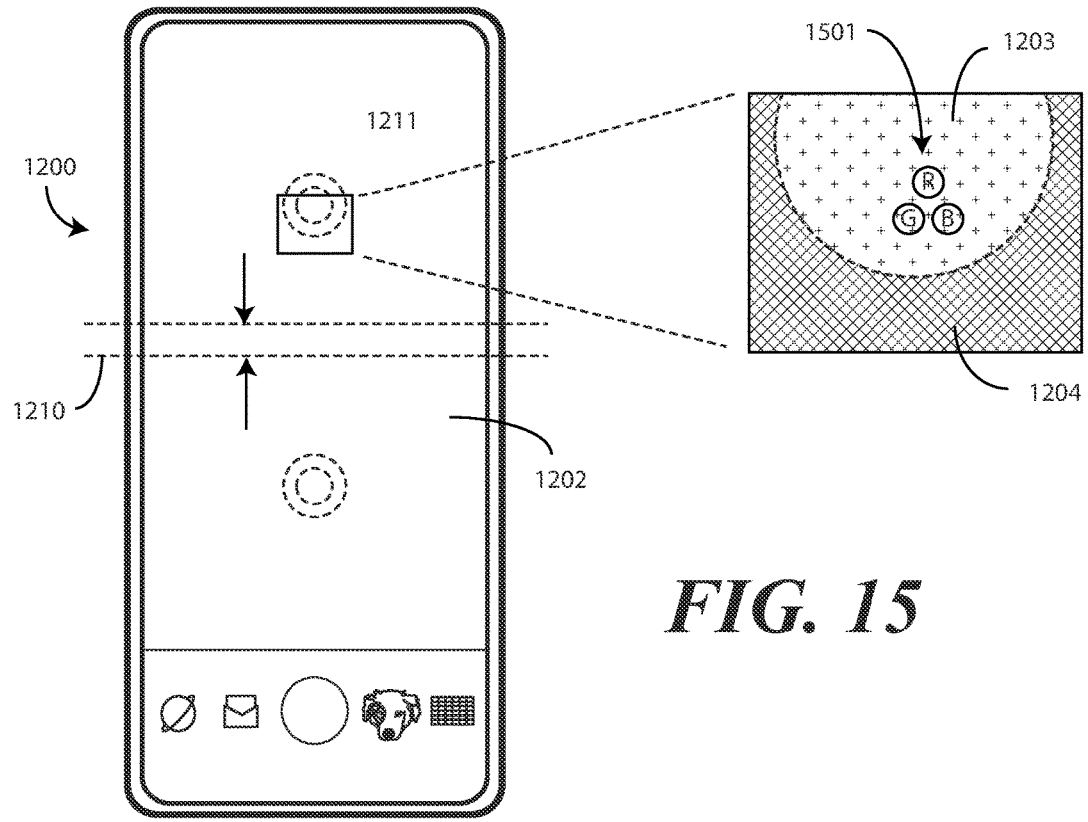
FIG. 15 illustrates another explanatory electronic device in accordance with one or more embodiments of the disclosure in an axially displaced open position, with a flexible display situated in a first position relative to an imager.
Figure 17:
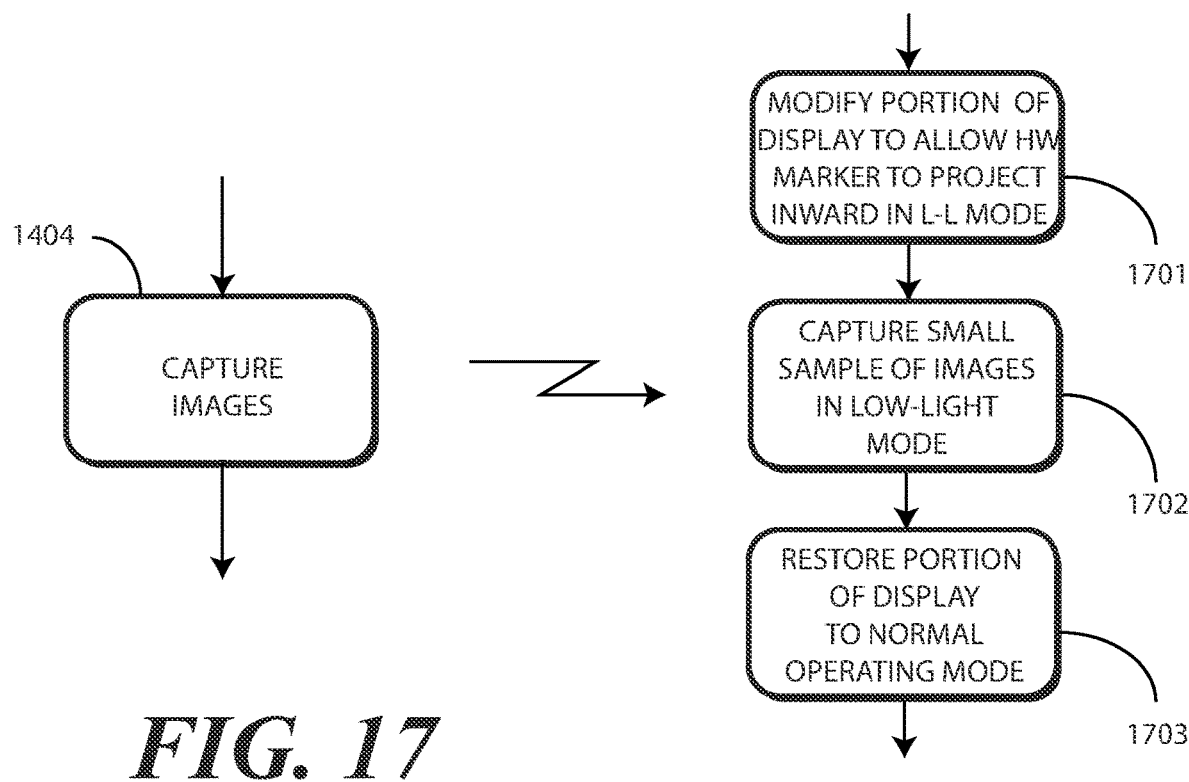
FIG. 17 illustrates one or more method steps in accordance with one or more embodiments of the disclosure.
Figure 18:
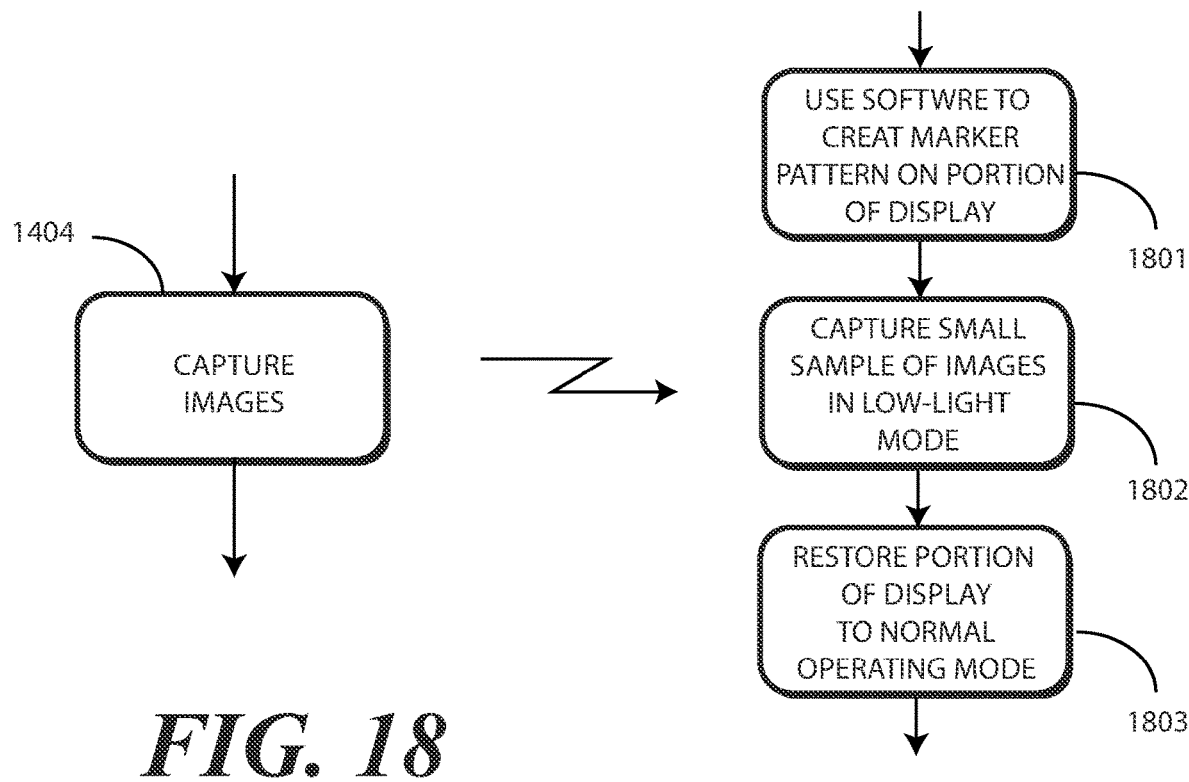
FIG. 18 illustrates one or more method steps in accordance with one or more embodiments of the disclosure.

Turning briefly to FIG. 17, in one or more embodiments step 1404 comprises modifying, before actually capturing the one or more images of the identifiable marker (1501) and after the one or more sensors of the electronic device detect the deformation, a portion of the flexible display positioned atop the imager to an altered mode of operation at step 1701. As shown in FIG. 15, this can comprise causing the first pixel portion 1203 of the flexible display 1202 to transition to a translucent or partially translucent mode of operation. Alternatively, step 1701 can comprise the one or more processors modifying a portion of the flexible display positioned above the at least one imager to operate in a low-light mode prior to the at least one imager capturing the one or more images, and so forth.

In one or more embodiments, step 1702 then comprises capturing the one or more images of the identifiable marker (1501) while operating in a low-light mode of operation. In one or more embodiments, step 1702 comprises capturing the one or more images of the identifiable marker (1501) only during the deformation of the deformable electronic device and ceasing capture of the one or more images in response to the one or more sensors detecting cessation of the deformation of the deformable electronic device (decision 1403 of FIG. 14).

At step 1703, one or more processors of the electronic device can restore, after the capturing the one or more other images of the identifiable marker (1501) and after cessation of the deformation of the deformable electronic device, the portion of the flexible display to a normal mode of operation. Where, for example, the first pixel portion (1203) was transitioned to a translucent or partially translucent state and/or ceased presenting content, the one or more processors may cause the first pixel portion (1203) to exit the translucent or partially translucent state and/or resume presenting content at step 1703.

Turning now to FIG. 18, illustrated therein is another way the image capture process of step 1401 can occur. As noted above, the identifiable marker (1501) need not be a hardware component of the flexible display. In other embodiments, the identifiable marker (1501) comprises content presented on the flexible display in response to instructions from the one or more processors. Accordingly, in one or more embodiments step 1801 can comprise causing, by the one or more processors, the flexible display to present content defining the identifiable marker. Alternatively, step 1801 can comprise the one or more processors modifying a portion of the flexible display positioned above the at least one imager to operate in a low-light mode prior to the at least one imager capturing the one or more images, and so forth.

In one or more embodiments, step 1802 then comprises capturing the one or more images of the identifiable marker (1501) while operating in a low-light mode of operation. In one or more embodiments, step 1802 comprises capturing the one or more images of the identifiable marker (1501) only during the deformation of the deformable electronic device and ceasing capture of the one or more images in response to the one or more sensors detecting cessation of the deformation of the deformable electronic device (decision 1403 of FIG. 14).

At step 1803, one or more processors of the electronic device can restore, after the capturing the one or more other images of the identifiable marker (1501) and after cessation of the deformation of the deformable electronic device, the portion of the flexible display to a normal mode of operation. Where, for example, the one or more processors caused the flexible display to present the identifiable marker at step 1801, the one or more processors can cause a cessation of the presentation of the identifiable marker at step 1803, and so forth. Thus, FIG. 18 illustrates an embodiment where step 1404 comprises the one or more processors cause the flexible display to present content defining an image marker that is identifiable to the at least one imager.

Turning now back to FIG. 14, at step 1405 the one or more processors of the electronic device can calculate an amount of translation of the flexible display from one or more images captured by the imager that results from the deformation. Illustrating by example, if the electronic device includes a hinge step 1405 can comprise the one or more processors calculating this amount when the first device housing and the second device housing pivot about the hinge between the axially displaced open position and the closed position, and so forth.

In one or more embodiments, step 1405 comprises the one or more processors determining the amount of translation as a function of how far the image marker moves. Once again, if the electronic device includes a first device housing that is pivotable about a hinge relative to a second device housing, step 1405 can determine the amount of translation as a function of how far the image marker moves when the first device housing and the second device housing pivot about the hinge between the axially displaced open position and the closed position.

Step 1406 can then comprise the one or more processors of the electronic device estimating a position of a first device housing portion relative to a second device housing portion in three-dimensional space as a function of the distance determined at step 1405. At step 1407, the one or more processors communicate the estimate of the position of the device housing portions to one or more applications operating on the electronic device. If, for example, the electronic device is a hinged electronic device, step 1407 can comprise the one or more processors communicating the estimate of the position of the first device housing relative to the second device housing in the three-dimensional space as the function of the amount of translation to at least one application operating in the deformable electronic device.

Thus, the method 1400 of FIG. 14 includes capturing, with an imager situated beneath a flexible display, at least one image of an identifiable marker situated at a fixed location on the flexible display when the deformable electronic device is configured in a predefined geometry. The method 1400 includes thereafter capturing, with the imager, one or more other images of the identifiable marker during or after deformation of the deformable electronic device. The method 1400 then includes estimating, with one or more processors, an amount of deformation of the deformable by comparing the at least one image and the one or more other images to determine how far the identifiable marker moved during the deformation of the deformable electronic device.

Figure 16:
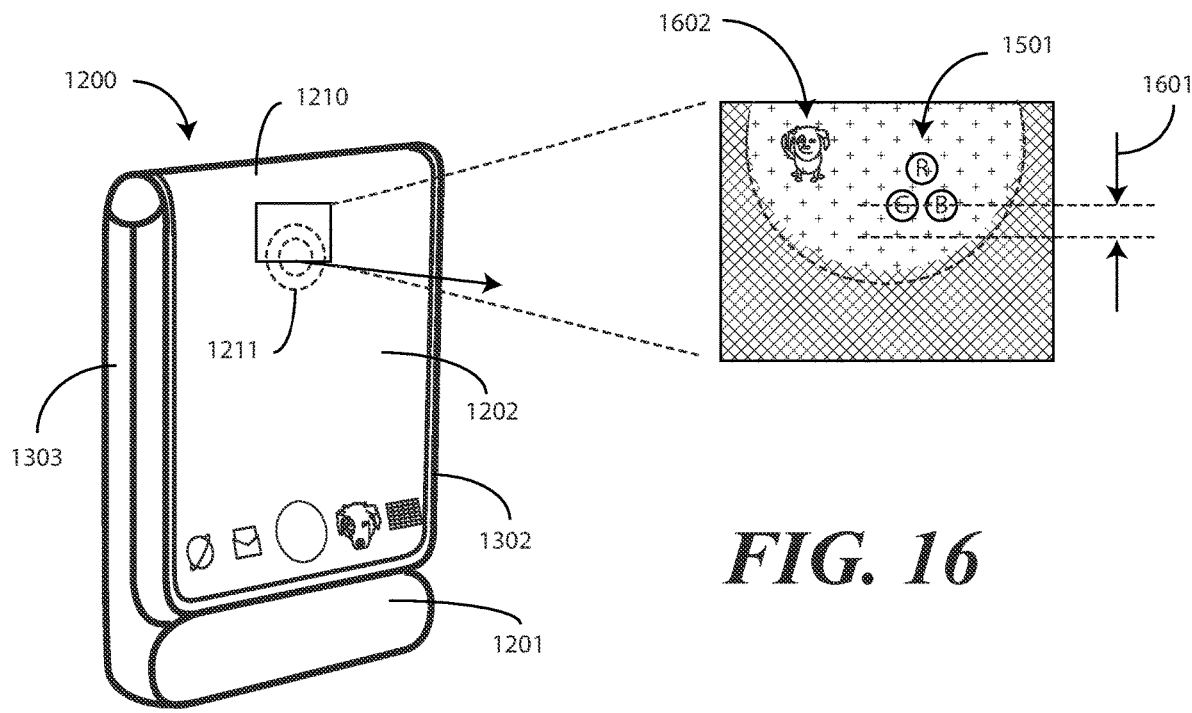
FIG. 16 illustrates the explanatory electronic device of FIG. 15 in a folded position, with the flexible display situated in a second position relative to the imager.

Turning now to FIGS. 15-16, elements of the method (1400) of FIG. 14 are illustrated pictorially. As shown in FIG. 16, a first device housing portion 1302 is separated from a second device housing portion 1303 by a deformation portion 1210. Since the device housing 1201 is flexible, the deformation portion 1210 simply comprises a section of the housing 1201. However, in other devices such as those described above with reference to FIGS. 1-11, the electronic device 1200 will include a first device housing (102) separated from a second device housing (103) by a hinge.

A flexible display 1202 coupled to the first device housing portion 1302 and the second device housing portion 1303. The flexible display 1202 spans the deformation portion 1210. If the electronic device 1200 were the electronic device (100) of FIG. 1, the flexible display 1202 would span the hinge.

By comparing FIGS. 15 and 16, it can be seen that a portion of the flexible display 1202 translates across the at least one imager 1211 when the first device housing portion 1302 and the second device housing portion 1303 pivot about the deformation portion 1210 (or hinge in a hinged device) between an undeformed position shown in FIG. 15 and a deformed position shown in FIG. 16. This is confirmed by the fact that the identifiable marker 1501 has moved across the imager 1211 by an amount of translation 1601.

In one or more embodiments, one or more processors of the electronic device 1200 determine the amount of translation 1601 of the flexible display 1202 from one or more images captured by the imager 1211 when the first device housing portion 1302 and the second device housing portion 1303 pivot about the deformation portion 1210 (or hinge in a hinged device) between these positions. In one or more embodiments, the imager 1211 captures the one or more images of the identifiable marker 1501 while operating in a low-light mode of operation. The one or more processors the estimate a position of the first device housing portion 1302 relative to the second device housing portion 1303 in three-dimensional space as a function of the amount of translation 1601.

In the illustrative embodiment of FIGS. 15 and 16, the flexible display 1202 comprises a hardware marker that defines the identifiable marker 1501 that is identifiable to the imager 1211. However, in other embodiments the identifiable marker comprises content 1602 presented on the flexible display 1202 in response to instructions from the one or more processors. In one or more embodiments, the one or more processors determine the amount of translation 1601 as a function of how far the identifiable marker 1501, be it a hardware marker, software marker, or other type of marker, moves when the first device housing portion 1302 and the second device housing portion 1303 pivot about the deformation portion 1210 (or hinge in a hinged device) between an undeformed geometry and a deformed geometry.

In one or more embodiments, the one or more images of the identifiable marker 1501 are captured by the imager 1211 in response to one or more sensors of the electronic device 1200 detecting the pivoting of the first device housing portion 1302 about the deformation portion 1210 (or hinge in a hinged device) relative to the second device housing portion 1303. As described above with reference to FIGS. 17-18, in some embodiments the one or more processors modify a portion of the flexible display 1202 positioned above the at least one imager 1211 to operate in a low-light mode prior to the at least one imager capturing the one or more images. The one or more processors can restore the portion of the flexible display 1202 to a normal operating mode after the imager 1211 captures the one or more images. The one or more processors can then communicate the estimate of the position of the first device housing portion 1302 relative to the second device housing portion 1303 in the three-dimensional space as the function of the amount of translation 1601 to at least one application operating in the electronic device 1200.

Figure 19:
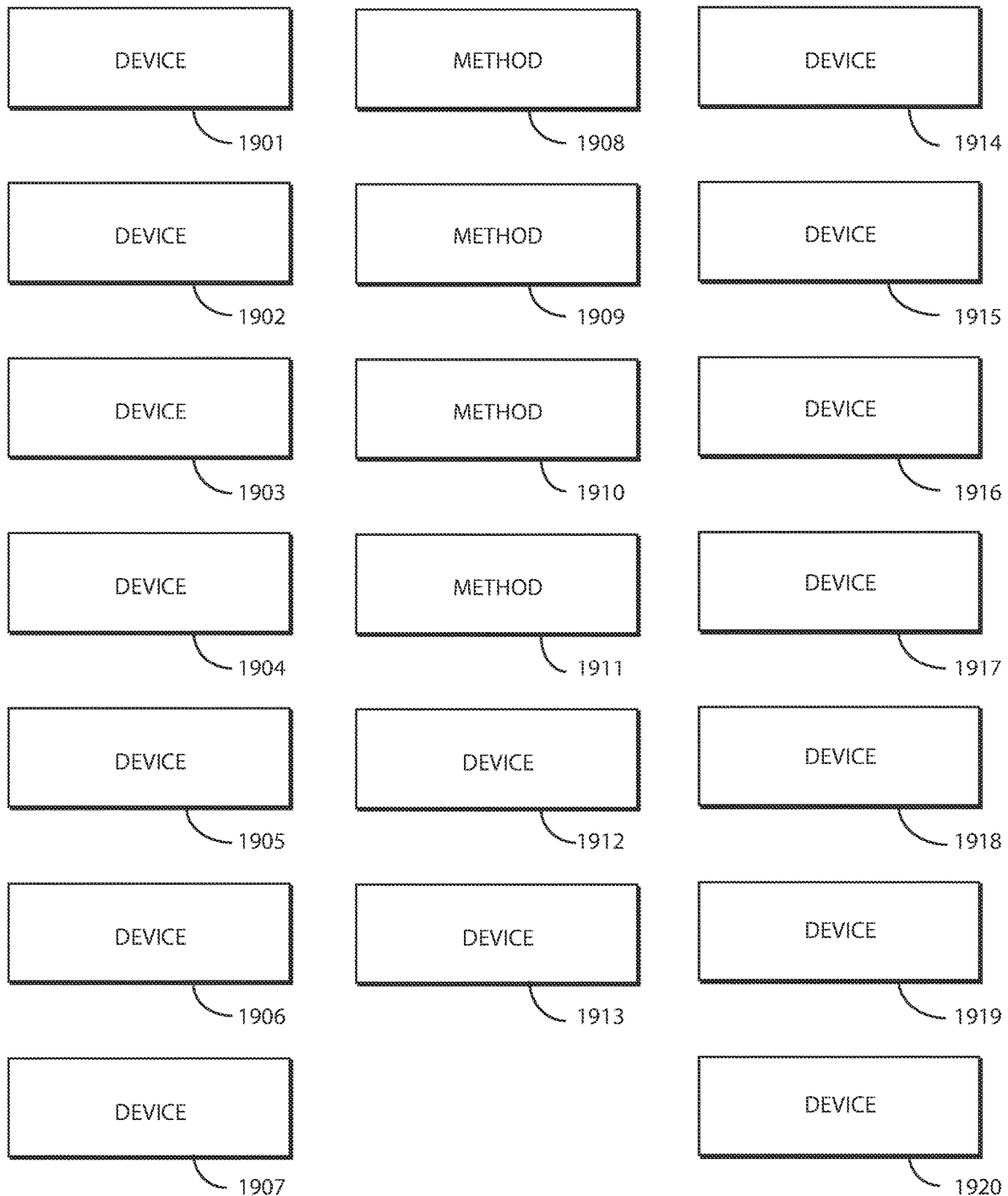
FIG. 19 illustrates various embodiments of the disclosure.

Turning now to FIG. 19, illustrated therein are various embodiments of the disclosure. The embodiments of FIG. 19 are shown as labeled boxes in FIG. 19 due to the fact that the individual components of these embodiments have been illustrated in detail in FIGS. 1-18, which precede FIG. 19. Accordingly, since these items have previously been illustrated and described, their repeated illustration is no longer essential for a proper understanding of these embodiments. Thus, the embodiments are shown as labeled boxes.

At 1901, a deformable electronic device comprises a flexible display. At 1901, the deformable electronic device comprises one or more sensors detecting deformation of the deformable electronic device.

At 1901, the deformable electronic device comprises at least one imager, disposed beneath the flexible display and capturing one or more images of an identifiable marker of the flexible display in response to the one or more sensors detecting the deformation of the deformable electronic device. At 1901, the one or more processors estimate an amount of the deformation of the deformable electronic device as a function of how far the identifiable marker of the flexible display translates across the at least one imager during the deformation of the deformable electronic device.

At 1902, the identifiable marker of 1901 comprises a hardware component of the flexible display. At 1903, the identifiable marker of 1901 comprises content presented on the flexible display in response to instructions from the one or more processors.

At 1904, the at least one imager of 1901 captures the one or more images of the identifiable marker while operating in a low-light mode of operation. At 1905, the at least one imager of 1901 ceases the capture of the one or more images in response to the one or more sensors detecting cessation of the deformation of the deformable electronic device.

At 1906, the at least one imager of 1905 captures the one or more images of the identifiable marker only during the deformation of the deformable electronic device. At 1907, the at least one imager of 1905 also captures other images of the identifiable marker when the deformable electronic device is configured in a predefined geometry.

At 1908, a method in a deformable electronic device comprises capturing, with an imager situated beneath a flexible display, at least one image of an identifiable marker situated at a fixed location on the flexible display when the deformable electronic device is configured in a predefined geometry. At 1908, the method comprises thereafter, capturing, with the imager, one or more other images of the identifiable marker during or after deformation of the deformable electronic device. At 1908, the method comprises estimating, with one or more processors, an amount of deformation of the deformable electronic device by comparing the at least one image and the one or more other images to determine how far the identifiable marker moved during the deformation of the deformable electronic device.

At 1909, the method of 1908 further comprises causing, by the one or more processors, the flexible display to present content defining the identifiable marker. At 1910, the method of 1908 further comprises detecting, with one or more sensors, the deformation of the deformable electronic device, wherein the capturing the one or more other images occurs in response to the detecting the deformation of the deformable electronic device.

At 1911, the method of 1910 further comprises modifying, by the one or more processors before the capturing the one or more other images and after the detecting the deformation of the deformable electronic device, a portion of the flexible display positioned atop the imager to an altered mode of operation. At 1911, the method comprises restoring, by the one or more processors after the capturing the one or more other images and after cessation of the deformation of the deformable electronic device, the portion of the flexible display to a normal mode of operation.

At 1912, a deformable electronic device comprises a first device housing coupled to a second device housing by a hinge. At 1912, the deformable electronic device comprises a flexible display coupled to the first device housing and the second device housing and spanning the hinge.

At 1912, the deformable electronic device comprises at least one imager situated beneath the flexible display. At 1912, the deformable electronic device comprises one or more processors operable with the at least one imager.

At 1912, a portion of the flexible display translates across the at least one imager when the first device housing and the second device housing pivot about the hinge between an axially displaced open position and a closed position. At 1912, the one or more processors determine an amount of translation of the flexible display from one or more images captured by the imager when the first device housing and the second device housing pivot about the hinge between the axially displaced open position and the closed position. At 1912, the one or more processors estimate a position of the first device housing relative to the second device housing in three-dimensional space as a function of the amount of translation.

At 1913, the hinge of 1912 changes a displacement between the first device housing and the second device housing when the first device housing pivots about the hinge between the axially displaced open position and the closed position, thereby causing the flexible display to translate across the at least one imager.

At 1914, the flexible display of 1912 comprises a hardware marker that is identifiable to the at least one imager. At 1914, the one or more processors determine the amount of translation as a function of how far the hardware marker moves when the first device housing and the second device housing pivot about the hinge between the axially displaced open position and the closed position.

At 1915, the one or more processors of 1912 cause the flexible display to present content defining an image marker that is identifiable to the at least one imager. At 1915, the one or more processors determine the amount of translation as a function of how far the image marker moves when the first device housing and the second device housing pivot about the hinge between the axially displaced open position and the closed position.

At 1916, the at least one imager of 1915 captures the one or more images while operating in a low-light mode of operation.

At 1917, the deformable electronic device of 1912 further comprises one or more sensors detecting pivoting of the first device housing about the hinge relative to the second device housing. At 1917, the one or more images captured by the imager are captured in response to the one or more sensors detecting the pivoting of the first device housing about the hinge relative to the second device housing.

At 1918, the one or more processors of 1917 modify a portion of the flexible display positioned above the at least one imager to operate in a low-light mode prior to the at least one imager capturing the one or more images. At 1919, the one or more processors of 1918 restore the portion of the flexible display to a normal operating mode after the imager captures the one or more images.

At 1920, the one or more processors of 1912 communicate the estimate of the position of the first device housing relative to the second device housing in the three-dimensional space as the function of the amount of translation to at least one application operating in the deformable electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A deformable electronic device, comprising:
   a flexible display;
   a housing spanning an entire major face of the flexible display without borders that picture frame the flexible display;
   one or more sensors detecting deformation of the deformable electronic device;
   at least one imager, disposed beneath the flexible display and capturing one or more images of an identifiable marker of the flexible display in response to the one or more sensors detecting the deformation of the deformable electronic device; and
   one or more processors estimating an amount of the deformation of the deformable electronic device as a function of how far the identifiable marker of the flexible display translates across the at least one imager during the deformation of the deformable electronic device;
   wherein:
     the at least one imager comprises two imagers each positioned beneath the flexible display;
     flexible display comprises a first pixel portion situated above a first imager of the two imagers and a second pixel portion situated at areas other than those positioned above the first imager;
     the first pixel portion comprises a combination of transparent organic light emitting diode pixels and reflective organic light emitting diode pixels; and
     the first pixel portion is centrally situated atop the first imager when the deformable electronic device is undeformed and is offset toward an edge of the first imager when the deformable electronic device is fully deformed.

2. The deformable electronic device of claim 1, wherein the identifiable marker comprises a hardware component of the flexible display.

3. The deformable electronic device of claim 1, wherein the identifiable marker comprises content presented on the flexible display in response to instructions from the one or more processors.

4. The deformable electronic device of claim 1, the at least one imager capturing the one or more images of the identifiable marker while operating in a low-light mode of operation.

5. The deformable electronic device of claim 1, the at least one imager ceasing capture of the one or more images in response to the one or more sensors detecting cessation of the deformation of the deformable electronic device.

6. The deformable electronic device of claim 5, the at least one imager capturing the one or more images of the identifiable marker only during the deformation of the deformable electronic device.

7. The deformable electronic device of claim 5, the at least one imager also capturing other images of the identifiable marker when the deformable electronic device is configured in a predefined geometry.

8. The deformable electronic device of claim 1, wherein the flexible display is exposed both when the deformable electronic device is in an axially displaced open position and when the deformable electronic device is in a fully deformed configuration.

9. The deformable electronic device of claim 1, wherein the identifiable marker comprises a group of three light emitting components recognizable by the first imager.

10. The deformable electronic device of claim 1, the one or more processors estimating the amount of the deformation of the deformable electronic device by comparing least one image captured by the at least one imager to at least one other image to determine how far the identifiable marker of the flexible display has moved during the deformation of the deformable electronic device.

11. The deformable electronic device of claim 1, wherein the second pixel portion comprises only the reflective organic light emitting diode pixels.

12. The deformable electronic device of claim 1, wherein the one or more processors are configured to cause the transparent organic light emitting diode pixels of the first pixel portion to cease emitting light while the one or more images are captured.

13. The deformable electronic device of claim 1, wherein the housing comprises a first device housing separated from a second device housing by a hinge.

14. The deformable electronic device of claim 13, wherein the first device housing is pivotable about the hinge relative to the second device housing between an axially displaced open position and a closed position.

15. A deformable electronic device, comprising:
a flexible display;
a housing spanning an entire major face of the flexible display without borders that picture frame the flexible display;
one or more sensors detecting deformation of the deformable electronic device;
at least one imager, disposed beneath the flexible display and capturing one or more images of an identifiable marker of the flexible display in response to the one or more sensors detecting the deformation of the deformable electronic device; and
one or more processors estimating an amount of the deformation of the deformable electronic device as a function of how far the identifiable marker of the flexible display translates across the at least one imager during the deformation of the deformable electronic device;
wherein:
the at least one imager comprises two imagers each positioned beneath the flexible display;
flexible display comprises a first pixel portion situated above a first imager of the two imagers and a second pixel portion situated at areas other than those positioned above the first imager;
the first pixel portion comprises a combination of transparent organic light emitting diode pixels and reflective organic light emitting diode pixels;
the first pixel portion is centrally situated atop the first imager when the deformable electronic device is undeformed and is offset toward an edge of the first imager when the deformable electronic device is fully deformed; and
the identifiable marker comprises is recognizable by the first imager.

16. The deformable electronic device of claim 15, wherein the housing comprises a first device housing separated from a second device housing by a hinge.

17. The deformable electronic device of claim 16, wherein the first device housing is pivotable about the hinge relative to the second device housing between an axially displaced open position and a closed position.

18. The deformable electronic device of claim 17, wherein the identifiable marker translates across the at least one imager when the first device housing pivots about the hinge relative to the second device housing.

19. The deformable electronic device of claim 15, wherein the identifiable marker comprises content being presented on the flexible display.

20. The deformable electronic device of claim 15, wherein the device housing comprises a hinge that defines a service loop for the flexible display with the deformable electronic device is deformed.

* * * * *